United States Patent [19]

Fukuda et al.

[11] Patent Number: 5,537,732
[45] Date of Patent: Jul. 23, 1996

[54] METHOD FOR MANUFACTURING A MAGNETIC HEAD CORE SLIDER

[75] Inventors: Naoya Fukuda, Aichi-ken; Soichiro Matsuzawa, Kuwana; Hideto Sandaiji, Kasugai; Eigo Hirotsuji, Konan, all of Japan

[73] Assignee: NGK Insulators, Ltd., Japan

[21] Appl. No.: 212,802

[22] Filed: Mar. 15, 1994

[30] Foreign Application Priority Data

Mar. 23, 1993 [JP] Japan ................................. 5-087888
Mar. 23, 1993 [JP] Japan ................................. 5-087889

[51] Int. Cl.$^6$ ............................................ G11B 5/127
[52] U.S. Cl. ................... 29/603.12; 360/103; 360/125
[58] Field of Search ............................. 29/603; 360/103, 360/125

[56] References Cited

U.S. PATENT DOCUMENTS

| | | | |
|---|---|---|---|
| 4,897,915 | 2/1990 | Ito | 29/603 |
| 4,972,279 | 11/1990 | Atesman et al. | 360/103 |
| 4,977,666 | 12/1990 | Suzuki | 29/603 |
| 5,052,099 | 10/1991 | Taguchi et al. | 29/603 |
| 5,168,407 | 12/1992 | Shimizu et al. | 360/103 |

FOREIGN PATENT DOCUMENTS

| | | | |
|---|---|---|---|
| 0146217 | 6/1985 | European Pat. Off. . | |
| 0499473 | 8/1992 | European Pat. Off. . | |
| 617413 | 9/1994 | European Pat. Off. | 360/103 |
| 62-92414 | 4/1987 | Japan . | |
| 62-185219 | 8/1987 | Japan . | |
| 62-298912 | 12/1987 | Japan . | |
| 62-298916 | 12/1987 | Japan . | |
| 63-87606 | 6/1988 | Japan . | |
| 4-259902 | 9/1992 | Japan . | |
| 5-120661 | 5/1993 | Japan | 360/103 |

OTHER PUBLICATIONS

Patent Abstracts of Japan, vol. 14, No. 525 (P–1132) 19 Nov. 1990.
Patent Abstracts of Japan, vol. 10, No. 225 (P–484) 6 Aug. 1986.
Patent Abstracts of Japan, vol. 10, No. 212 (P–480) 24 Jul. 1986.
Patent Abstracts of Japan, vol. 16, No. 527 (P–1447) 29 Oct. 1992.
Patent Abstracts of Japan, vol. 12, No. 34 (P–662) 2 Feb. 1988.
Patent Abstracts of Japan, vol. 4, No. 21 (E–172) 21 Feb. 1980.
Patent Abstracts of Japan, vol. 13, No. 337 (P–906) 28 Jul. 1989.
Database WPI, Section EI, Week 8548, Nov. 1985.
Patent Abstracts of Japan, vol. 12, No. 388 (P–771) 17 Oct. 1988.

*Primary Examiner*—S. Thomas Hughes
*Attorney, Agent, or Firm*—Parkhurst, Wendel & Rossi

[57] ABSTRACT

A composite type magnetic head core slider including a slider body and a core chip, wherein a slot is formed in the slider body such that the slot is open in an end face of the slider body and located within a width of a central recessed portion between two parallel air-bearing portions formed on a surface of the slider body which is to face a magnetic disk, or within a width of an outer recessed portion disposed on one side of one of the air-bearing portions, which one side is remote from the central recessed portion. The core chip is fixed in the slot such that an upper end portion of the core chip protrudes above a surface of the central or outer recessed portion, and the protruding upper end portion of the core chip is subjected to an operation to form a track portion having a magnetic gap.

28 Claims, 12 Drawing Sheets

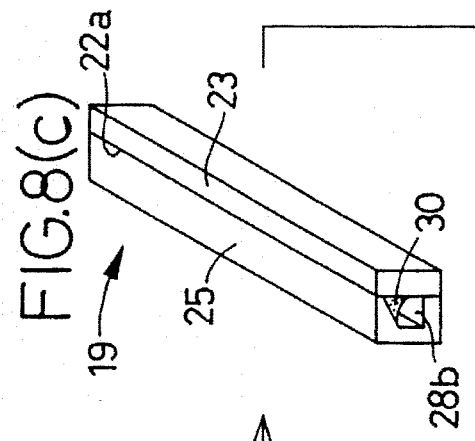
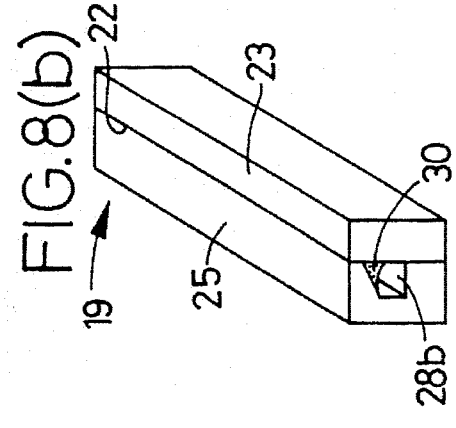
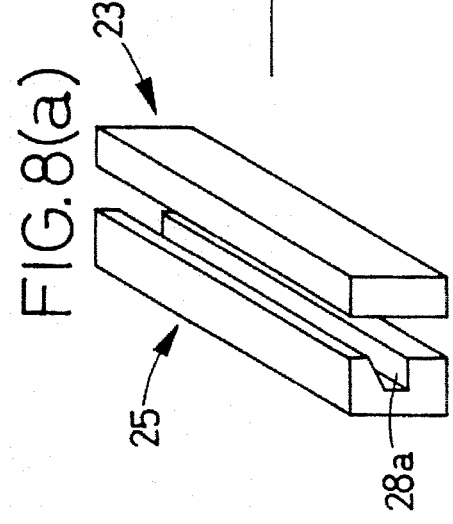
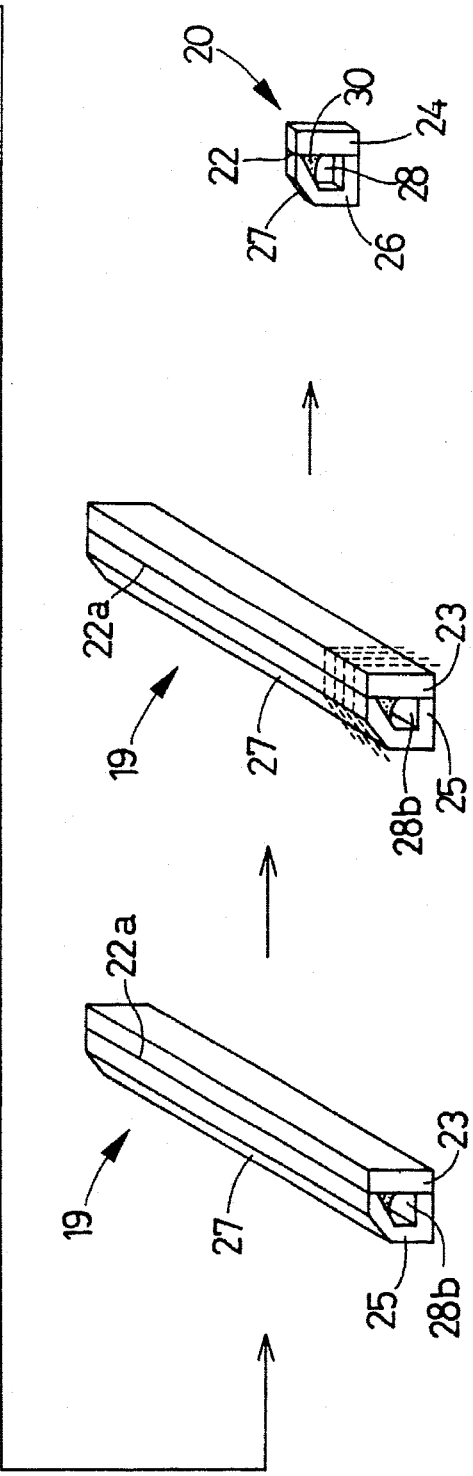

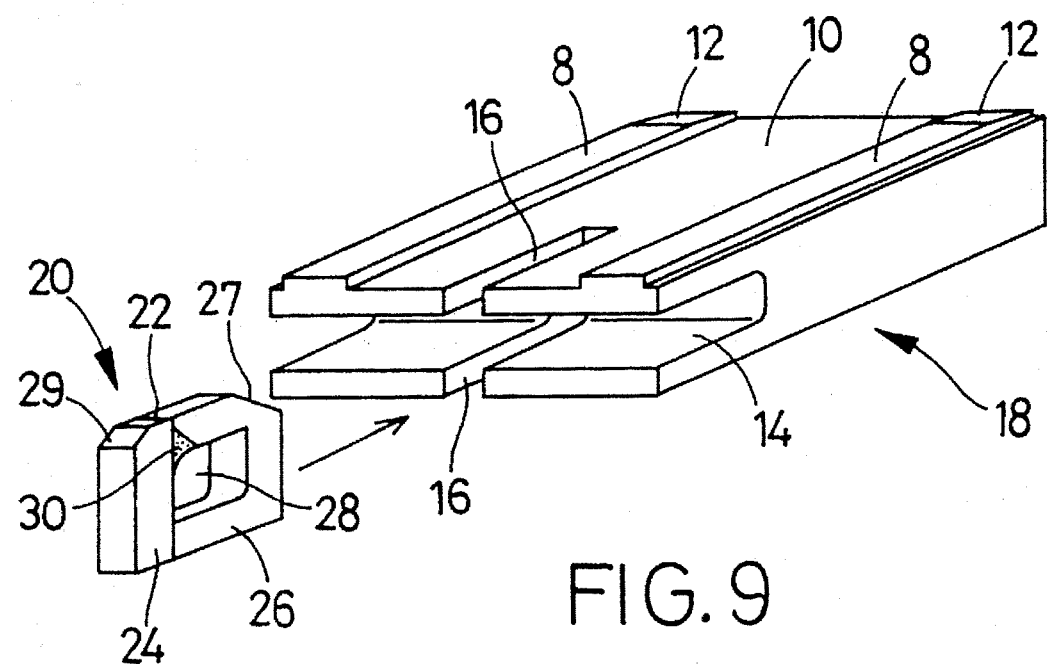
FIG. 9
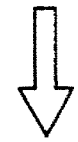
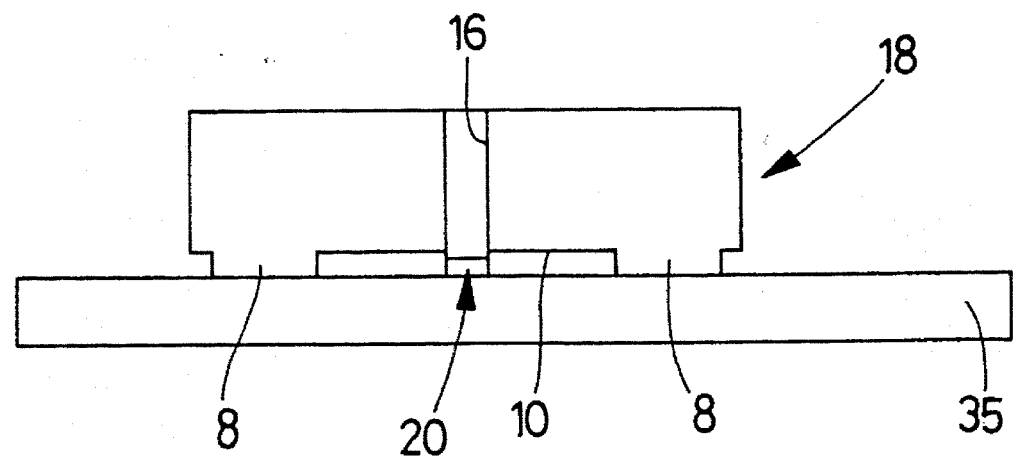
FIG. 10

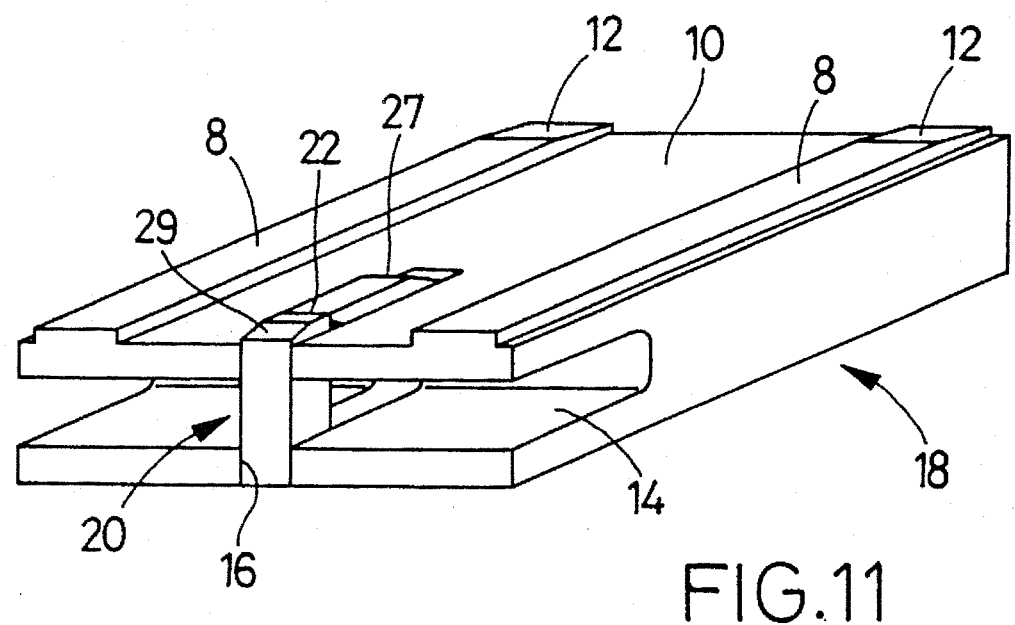
FIG.11
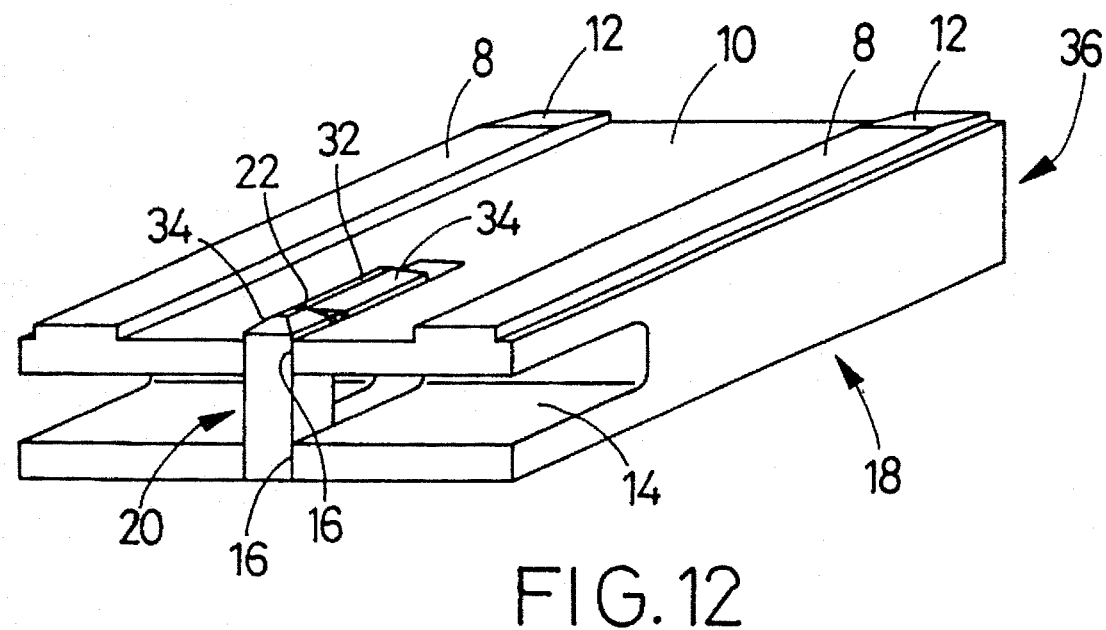
FIG.12

METHOD FOR MANUFACTURING A MAGNETIC HEAD CORE SLIDER

BACKGROUND OF THE INVENTION

1. Field of the Invention

The present invention relates in general to a composite type magnetic head core slider for a rigid or hard magnetic disk drive, in which a core chip with a writing/reading portion is integrally positioned and fixed in a slider body having air-bearing portions, and a method of manufacturing such a magnetic head core slider. More particularly, the present invention is concerned with techniques for effectively improving the accuracy of a magnetic gap depth of the core chip and/or the flatness of the head core slider surface having the air-bearing portions, to assure high operating reliability of the head core slider.

2. Discussion of the Related Art

As an air-bearing or flying type magnetic head core slider for a rigid magnetic disk drive device, there is known a so-called "composite type" head core slider, which consists of a slider body and a core chip that are prepared independently of each other. The slider body has air-bearing portions, while the core chip has a writing/reading portion for writing and reading information on a magnetic disk. The slider body and the core chip are integrally assembled into the magnetic head core slider. This composite type magnetic head core slider, which is distinguished from a monolithic type, has a smaller thickness at the writing/reading portion and an accordingly lower inductance value of the writing/reading portion, and features improved operating characteristics for high-frequency writing and reading of information, as compared with the monolithic type.

An example of a known method of manufacturing such composite type magnetic head core slider is illustrated in FIGS. 15(a), 15(b) and 15(c). Described specifically, the head core slider consists of a slider body 40 and a core chip 50 which are prepared independently of or separately from each other. As shown in FIG. 15(a), the slider body 40 has two air-bearing portions 42 in the form of two parallel rails formed on an upper surface thereof, and a coil-winding groove 44 and a slot 46 formed at one of the opposite ends thereof as seen in the direction of relative movement of the slider body 40 and a magnetic disk, namely, in the direction of extension of the air-bearing portions 42. The slot 46 is aligned with one of the two air-bearing portions 42, and the coil-winding groove 44 is provided for winding a coil on the core chip 50 inserted in the slot 46. As shown in FIG. 15(b), the core chip 50 has a generally rectangular frame structure having a generally rectangular coil-winding aperture 58, and a track portion 56 which has a magnetic gap 54 formed therethrough and open to the coil-winding aperture 58. The magnetic gap 54 is filled with a protective glass filler 52. The track portion 56, which is separated by the gap 54 into two parts, is shaped by suitable machining so that the track portion 56 has a desired height dimension. The core chip 50 thus constructed is inserted and positioned in the slot 46 of the slider body 40, and a glass rod 60 is placed in contact with the track portion 56 and the adjacent portion of the slider body 40, as shown in FIG. 15(c). The glass rod 60 is then heated to a molten state so that the core chip 50 is bonded to the slider body 40 by a glass filler 61 (FIG. 16). Subsequently, the upper surfaces of the air-bearing portions 42 are ground concurrently with the track portion 56 of the core chip 50, so that the magnetic gap 54 has a predetermined depth value. Thus, a composite type magnetic head core slider 62 as shown in FIG. 16 is produced. The grounding operation to establish the predetermined depth of the magnetic gap 54 will be referred to as "gap depth grinding" where appropriate.

According to the known method of manufacture of the magnetic head core slider 62 as described above, it is difficult to achieve accurate measurement of the depth value of the magnetic gap 54 (which is a distance between the sliding surface or upper surface of the track portion 56 and the upper edge of the coil-winding aperture 58) during the gap depth grinding, in the presence of the glass filler 61 which fills a bottom or lower end portion of the magnetic gap 54 adjacent to the upper end of the coil-winding aperture 58. Consequently, it is difficult to establish the desired depth value of the magnetic gap 54 (hereinafter referred to as "gap depth" where appropriate) by the gap depth grinding. This means a potential problem that the magnetic heads of the individual head core sliders produced suffer from a considerable variation in the operating characteristics.

The magnetic head core slider 62 shown in FIG. 16 suffers from another potential problem which arises from the glass filler 61 exposed to the upper surfaces of the air-bearing portions 42. That is, the glass filler 61 may fuse or corrode due to aqueous and other components in the ambient air, and may cause a tendency of sticking of the magnetic head (head core slider) to a magnetic disk, and consequent deterioration of the operating reliability of the magnetic head.

In the light of the above drawbacks experienced in the prior art, techniques for improving the accuracy of the gap depth of the magnetic head are proposed as disclosed in JP-A-62-185219 and JP-A-62-298916, wherein the core chip is attached to the slider body such that the core chip protrudes a given distance from one end of the slider body in the direction of relative movement between the head core slider and the magnetic disk, so that the magnetic gap portion of the core chip is visible from the outside of an intermediate assembly of the core chip and slider body. This arrangement facilitates the measurement of the gap depth of the magnetic head. JP-A-62-298912 proposes the use of a core chip which has a chamfered region formed at an upper part of the magnetic gap portion, so that the chamfered region can be used to measure the gap depth of the core chip after it is fixedly positioned in the slider body. Described in detail, the length of the chamfered region is measured while the core chip is subjected to the gap depth grinding operation, and the grinding operation is completed when the measured length of the chamfered region coincides with a value corresponding to the desired gap depth. This technique permits improved accuracy of the gap depth value.

In the conventional methods of manufacturing the composite type magnetic head core slider with improved accuracy of the gap depth as discussed above, the core chip is positioned in alignment with one of the air-bearing portions (air-bearing portions 42 as shown in FIG. 16) or a center rail between the air-bearing portions. Therefore, a glass filler for bonding the core chip to the slider body is necessarily exposed on a sliding surface of the head core slider on which a magnetic disk rotates in an air-bearing or flying fashion. When the rigid magnetic disk drive device is at rest, the magnetic disk at rest may contact the glass filler, whereby the magnetic head core slider still suffer from a possibility of sticking to the magnetic disk. Further, the track portion of the core chip is finished or finally shaped before the core chip is attached to the slider body, and the gap depth grinding is effected on the core chip attached to the slider body, namely, after the track portion is finally shaped. Accordingly, the width of the track portion may fluctuate or deviate from the nominal value, depending upon the amount of the gap depth grinding, leading to a variation of the operating characteristic of the magnetic head. The method disclosed in JP-A-62-298912 in which the core chip has the chamfered region for measuring the gap depth also suffers from a problem that the chamfered region provided on the track portion, which constitutes a part of the sliding surface of the head core slider, adversely influences the sliding or air-bearing property of the head core slider with respect to the magnetic disk and the characteristics of the magnetic head. Thus, the provision of the chamfered region is never desirable.

On the other hand, JP-A-63-292414 proposes a composite magnetic head core slider of air-bearing or flying type, in which the core chip is fixedly positioned between left and right air-bearing portions formed on the slider body, after the track portion of the core chip is finally shaped so as to have a relatively small width. The core chip should be positioned with respect to the slider body such that the track portion of the core chip has the same height as the air-bearing portions of the slider body, for uniform air-bearing property over the entire sliding surface of the head core slider with respect to the magnetic disk. Further, utmost cares should be exercised to protect the thin-walled track portion of the core chip when the core chip is positioned relative to the slider body. Thus, assembling of the slider body and the core slider required a cumbersome procedure. If this procedure is replaced by a gap depth grinding operation to simultaneously grind the air-bearing portions and the track portion so that the air-bearing and track portions have the same height dimension, the width of the track portion may fluctuate depending upon the specific amount of the gap depth grinding.

The composite magnetic head core slider shown in FIG. 16 suffers from a further problem which may arise from buckling, warpage or flexture of the slider body during the manufacture. Described specifically, the coil-winding groove 44 is formed to a predetermined depth through one of the opposite end portions of the slider body 40, such that the groove 44 is open on the appropriate end face of the slider body and separates the corresponding end portion of the slider body into opposed two thickness portions. These two thickness portions, which are disposed on the opposite sides of the groove 44, are connected by the core chip 50, at local parts of the slider body 40 which define the slot 46 in which the core chip 50 is received as indicated in FIG. 16. Accordingly, the parts of the opposed thickness portions of the slide body 40 which are relatively remote from the core chip 50 or slot 46 tend to undergo buckling, warpage or flexture. Such buckling or flexture at the thickness portion on the side of the air-bearing portions 42, in particular, deteriorates the flatness of the air-bearing surfaces of air-bearing portions 42, and have an adverse influence on the air-bearing property of the head core slider and the operating characteristics of the magnetic head. This deterioration of the flatness of the air-bearing portions 42 is serious in view of a recently increasing need for minimizing the flying height of the magnetic disk (i.e., distance between the air-bearing surfaces of the slider body 40 and the surface of the magnetic disk), in an attempt to achieve high-density recording of information on the magnetic disk by the magnetic disk drive.

Publication No. 63-87606 of unexamined Japanese Utility Model Application proposes the use of a reinforcing member disposed within the coil-winding groove in the slider body of a composite type magnetic head core slider. The reinforcing member reinforces the end portion of the slider body remote from the core chip, to thereby improve the flatness of the air-bearing portion. However, the proposed provision of the reinforcing member requires a cumbersome procedure to fix the reinforcing member within the coil-winding groove. If the reinforcing member is formed as an integral part of the slider body, it would be difficult to form the coil-winding groove, which has a complicated configuration.

SUMMARY OF THE INVENTION

It is therefore a first object of the present invention to provide a method which permits easy manufacture of a composite type magnetic head core slider for a rigid magnetic disk drive, and which assures high operating reliability of the head core slider, with improved degrees of accuracy of the depth dimension of the magnetic gap and width dimension of the track portion of the core chip, and without a possibility of sticking to a magnetic disk.

It is a second object of this invention to provide a method of manufacturing a composite type magnetic head core slider for a rigid magnetic disk drive, which method is effective to prevent buckling, warpage or flexure of the slider body at a portion thereof defining a coil-winding groove, and thereby avoid deterioration of the flatness of the air-bearing surfaces on the slider body.

It is a third object of this invention to provide a composite type magnetic head core slider for a rigid magnetic disk drive, which slider is free from buckling, warpage or flexure of the slider body at a portion thereof defining a coil-winding groove.

The first object indicated above may be achieved according to one aspect of the present invention, which provides a method of manufacturing a composite type magnetic head core slider for a rigid magnetic disk drive, including a slider body and a core chip, the slider body having a pair of parallel air-bearing portions on a surface thereof which is to face a magnetic disk, a central recessed portion disposed between the pair of air-bearing portions, and a slot open on an end face thereof in a direction of extension of the air-bearing portions, the core chip being fixed in the slot and having a coil-winding aperture, an annular magnetic path defined in the presence of the aperture, and a magnetic gap which intersects the annular magnetic path, the method comprising the steps of: (a) forming the slot in the slider body such that the slot is located within a width of the central recessed portion as measured in a direction perpendicular to the direction of extension of the pair of air-bearing portions, or a width of an outer recessed portion disposed on one side of one of the air-bearing portions, which one side is remote from the central recessed portion; (b) positioning and fixing the core chip in the slot such that an upper end portion of the core chip which has the magnetic gap protrudes a predetermined distance above a surface of the central or outer recessed portion; and (c) subjecting the upper end portion of the core chip to an operation to form a track portion which has a leading part and a trailing part which are spaced apart by the magnetic gap in the direction of extension of the air-bearing portions.

In the method of the present invention described above, the the core chip is positioned and fixed in the slot such that the upper end portion of the core chip protrudes a suitable distance above the surface of the central or outer recessed portion, so that the depth dimension of the magnetic gap as measured in the direction of extension of the upper end portion of the core chip is visible or can be directly observed. Accordingly, the depth dimension of the magnetic gap can be easily measured when the top face of the protruding upper end portion of he core chip is ground so as to establish the desired depth dimension of the magnetic gap. In the case where the core chip is ground to establish the desired depth dimension of the magnetic gap before the core chip is fixed in the slider body, the core chip whose magnetic gap has the desired depth dimension is positioned and fixed in the slot such that the ground top surface of the core chip is flush with the surfaces of the air-bearing portions. In either case, therefore, the magnetic gap of the core chip fixed in the slider body has the desired or nominal depth dimension as established by a grinding operation on the core chip alone or on the core chip and the slider body.

Further, since the slot in which the core chip is positioned and fixed is located within the width of the central or outer recessed portion, and since the upper end portion of the core chip fixed in the slot protrudes above the surface of the central or recessed portion which is lower than the surfaces of the air-bearing portions, a bonding glass used to fix the core chip in the slot will not be exposed on the surfaces of the air-bearing portions on which the magnetic disk rotates in an air-bearing or flying fashion. This arrangement prevents a direct contact of the bonding glass with the magnetic disk, and sticking of the magnetic head (magnetic head core slider) with the magnetic disk, whereby the operating reliability of the head core slider is significantly improved.

According to the present method, the core chip can be ground to establish the desired depth dimension of the magnetic gap before the core chip is processed to form the track portion having a desired width. Therefore, the gap depth grinding operation to establish the desired depth of the magnetic gap would not influence the width of the track portion. Namely, since the width of the track portion is solely determined during the operation to form the track portion, the width of the track portion formed does not deviate from the nominal or desired value. Thus, the present method effectively eliminates an otherwise possible variation in the operating characteristics of the magnetic head due to a variation in the width of the track portion. Since the gap depth grinding operation does not affect the width of the track portion, the width of the track portion can be accurately controlled even when the nominal width is sufficiently small.

In one preferred form of the invention, the method further comprises a step of effecting a grinding operation to concurrently grind surfaces of the pair of air-bearing portions and a surface of the upper end portion of the core chip which are to face the magnetic disk, so that the air-bearing portions and the upper end portion of the core chip have the same height from the surface of the central or outer recessed portion, and so that the magnetic gap has a predetermined depth dimension as measured in a direction of protrusion of the upper end portion of the core chip from the surface of the central or outer recessed portion. The step of subjecting the upper end portion of the core chip to an operation to form a track portion is effected following the grinding operation.

In an alternative preferred form of the invention, a top surface of the upper end portion of the core chip which is to face the magnetic disk is ground such that the magnetic gap has a predetermined depth dimension, and the core chip is fixed in the slot such that the ground top surface of the upper end portion of the core chip prepared is flush with the surfaces of the pair of air-bearing portions.

In the above alternative preferred form of the invention, the core chip may be prepared by (i) butting and bonding together two blocks of a magnetic material to prepare a gapped bar which has an opening, an annular magnetic path in the presence of the opening, and a clearance between the two blocks; (ii) grinding a surface of the gapped bar on which the clearance is open such that the clearance has a depth dimension equal to the predetermined depth dimension of the magnetic gap; and (iii) cutting the gapped bar into a plurality of pieces each serving as the core chip, the opening and the clearance of the gapped bar providing the coil-winding aperture and the magnetic gap of the core chip, respectively.

The core chip is fixed in the slot or fixed to the slider body, by a suitable adhesive or bonding agent. For instance, a softened or molten glass is applied to a clearance between at least one inner surface of the slider body which at least partially defines the slot and at least one outer surface of the core chip which faces the at least one inner surface of the slider body. In this case, the slot may be at least partially defined by a glass filler, which is heated after the core chip is positioned in the slot, to bond the core chip to the slider body by the glass filler. Alternatively, an adhesive is applied to the clearance between the inner surface of the slider body and the outer surface of the core chip. The adhesive may be an epoxy resin in a liquid phase present in the clearance between the inner surface of the slider body and the outer surface of the core chip. In this case, the core chip is bonded to the slider body by thermal setting of the epoxy resin. The adhesive may be a water glass present in the clearance between the inner surface of the slider body and the outer surface of the core chip. In this case, the core chip is bonded to the slider body by heating and drying the water glass.

According to a further preferred form of the invention, the method further comprises a step of forming a coil-winding groove in the slider body such that the coil-winding groove intersects the slot and is open on at least the end face of the slider body in the direction of extension of the air-bearing portions. The coil-winding groove may be formed such that a surface defining a depth of the coil-winding groove as measured in the direction of extension of the air-bearing portions is parallel to the end face of the slider body on which the slot is open. This arrangement is desirable when the slot is located within the width of the central recessed portion of the slider body.

In one arrangement of the above form of the invention, the coil-winding groove may be dimensioned such that a depth of the coil-winding groove as measured in the direction of extension of the air-bearing portions is larger than a length of the core chip as measured in the direction of extension of the air-bearing portions. In this case, the coil-winding groove is preferably designed to cooperate with the slot to provide a space around portions of the core chip positioned within the slot, which portions constitute respective parts of the annular magnetic path which define the magnetic gap therebetween. The space should be ample enough to allow coils to be wound on the above-indicated portions of the core chip. According to this arrangement, it is desirable to form the coil-winding groove such that the groove is open on the end face of the slider body on which the slot is open, and is also open on a side face of the slider body which is adjacent to the end face. This groove may be formed such that the surface defining the depth of the coil-winding groove is inclined a suitable angle with respect to the end face of the slider body on which the slot is open. This arrangement is desirable when the slot is located within the width of the outer recessed portion of the slider body. In this instance, the side face of the slider body on which the coil-winding groove is open is adjacent or continuous to a surface of the outer recessed portion.

The second object indicated above may be achieved according to a second aspect of this invention, which provides a method of manufacturing a composite type magnetic head core slider for a rigid magnetic disk drive, including a slider body and a core chip, the slider body having (a) a pair of parallel air-bearing portions formed on a surface thereof which is to face a magnetic disk, (b) a coil-winding groove which is open on one of end faces of the slider body which are opposite to each other in a direction of extension of the air-bearing portions, the coil-winding groove extending in a direction perpendicular to the direction of extension of the air-bearing portions, (c) and a slot (16) which intersects the coil-winding groove and extends in the direction of extension of the air-bearing portions, the core chip having a magnetic gap and being positioned and fixed in the slot, the method comprising the steps of: (i) forming the coil-winding groove so as to separate an end portion of the slider body which corresponds to the one of end faces of the slider body, into two opposed thickness portions which are opposed to each other in a direction perpendicular to the directions of extension of the air-bearing portions and the coil-winding groove; and (ii) removing at least a part of at least one of the two opposed thickness portions, so as to form at least one chip support arm which is adjacent to the core chip and which partially defines the slot.

In the method according to the second aspect of the present invention described above, the coil-winding groove is formed such that an end portion of the slider body which corresponds to the end face on which the slot is open is separated by the coil-winding groove into two opposed thickness portions which are opposed to each other in a direction perpendicular to the direction of extension of the air-bearing portions and the direction of extension of the coil-winding groove. At least a part of at least one of the two opposed thickness portions is removed so that at least one chip support arm is formed adjacent to the core chip, so as to partially define the slot in which the core chip is positioned and fixed. The removal of a part or parts of one or both of the two opposed thickness portions which define the coil-winding groove effectively reduces or minimizes the amount of buckling, warpage or flexure of the slider body at its end portion through which the coil-winding groove is formed. In other words, the part or parts of the end portion of the slider body which is/are likely to have such buckling, warpage or flexure due to the presence of the coil-winding groove is/are removed to thereby improve the flatness of the slider body, particularly, the flatness of the surfaces of the air-bearing portions over which the magnetic disk rotates in an air-bearing or flying fashion. Thus, the present method of manufacture effectively prevents deterioration of the operating characteristics of the magnetic head core slider due to the buckling, warpage or flexure of the slider body. The improved degree of flatness of the air-bearing portions is particularly important for a magnetic disk drive adapted to effect high-density recording of information, which requires a relatively small flying height of the magnetic disk from the surfaces of the air-bearing portions.

Further, the chip support arms formed as a result of the partial removal of the two opposed thickness portions of the slider body may advantageously cooperate with the core chip to function as a bobbin or bobbins for retaining a coil or coils in place and facilitate winding of the coil or coils on the core chip, without an exclusive bobbin or bobbins, while preventing irregular or disorderly winding of the coil or coils.

In the case where the slot is located within the width of a central recessed portion disposed between the two air-bearing portions on the slider body, parts of one or both of the two opposed thickness portions of the slider body which parts are located on both sides of the core chip are removed, so that at least two chip support arms are formed on both sides of the core chip. The parts to be removed may be those of the two opposed thickness portions, so that two chip support arms are formed on one side of the core chip while two other chip support arms are formed on the other side of the core chip. Alternatively, the parts to be removed may be those of one of the two opposed thickness portions which has the air-bearing portions, so that two chip support arms are formed on both sides of the core chip, respectively, and adjacent to the central recessed portion. However, the part or parts of at least one of the two opposed thickness portions which is/are located on one of opposite sides of the core chip may be removed.

In the case where the slot is aligned with one of the two air-bearing portions, a part of one or both of the two opposed thickness portions of the slide body which part is located on one of opposite sides of the core chip may be removed, so that at least one chip support arm is formed on one side of the core chip. For instance, parts of both of the two opposed thickness portions which are located on one side of the core chip are removed so that at least two chip support arms are formed on one side of the core chip.

The part or parts of one or both of the two opposed thickness portions of the slider body may correspond to a portion of the depth of the coil-winding groove as measured in the direction of extension of the air-bearing portions. In this case, the originally formed coil-winding groove is partially left in the slider body. Alternatively, the part or parts to be removed may correspond to the entire depth of the coil-winding groove. In this case, the originally formed coil-winding groove is not left, except its portions adjacent to the slot or core chip.

The third object indicated above may be achieved according to a third object of the present invention, which provides a composite type magnetic head core slider for a rigid magnetic disk drive, including (a) a slider body having a pair of parallel air-bearing portions formed on a surface thereof which is to face a magnetic disk, and a slot formed at one of opposite ends thereof which are opposite to each other in a direction of extension of the air-bearing portions, the slot extending in the direction of extension of the air-bearing portions, and (b) a core chip positioned and fixed in the slot of the slider body and having a magnetic gap, wherein the slider body includes at least one chip support arm extending in the direction of extension of the air-bearing portions, from a plane including end faces of the air-bearing portions which correspond to the above-indicated one of opposite ends of the slider body. The at least one chip support arms at least partially defines the slot and supports the core chip. Each chip support arm is spaced from the air-bearing portions in a direction perpendicular to the direction of extension of the air-bearing portions.

In the composite type magnetic head core slider constructed according to the third aspect of this invention described above, each chip support arm extends from the plane which includes the end faces of the air-bearing portions, and is spaced from the air-bearing portions in the direction perpendicular to the direction of extension of the air-bearing portions. Accordingly, the slider body does not suffer from buckling, warpage or flexure experienced in the prior art.

In one form of the invention according to the third aspect of the invention, the slot is located between the pair of air-bearing portions. In this case, a total of four chip support arms may be provided. Namely, there are formed two chip support arms on one side of the slot as viewed in the direction perpendicular to the direction of extension of the air-bearing portions, and two further chip support arms on the other side of the slot.

In another form of the invention, two chip support arms are disposed on both sides of the slot as viewed in the direction perpendicular to the direction of extension of the air-bearing portions. In this case, these two chip support arms preferably have the same height as the surface of a central recessed portion disposed between the pair of air-bearing portions. This arrangement effectively prevents buckling, warpage or flexure of the air-bearing portions.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIGS. 8(a) through 8(f) are perspective views illustrating a process of manufacturing a core chip used in a method of manufacturing a composite type magnetic head core slider according to a further embodiment of the present invention;

FIG. 9 is a perspective view a step of inserting the core chip manufactured by the process of FIGS. 8, into a slider body;

FIG. 10 is an elevational view indicating a manner of positioning the core chip with respect to the slider body;

FIG. 11 is a perspective view showing an intermediate assembly in which the core chip is positioned with respect to the slider body in the manner indicated in FIG. 10;

FIG. 12 is a magnetic head core slider produced by a machining operation on the core chip of the assembly of FIG. 11 to shape a track portion;

DETAILED DESCRIPTION OF THE PREFERRED EMBODIMENTS

Figure 1A:
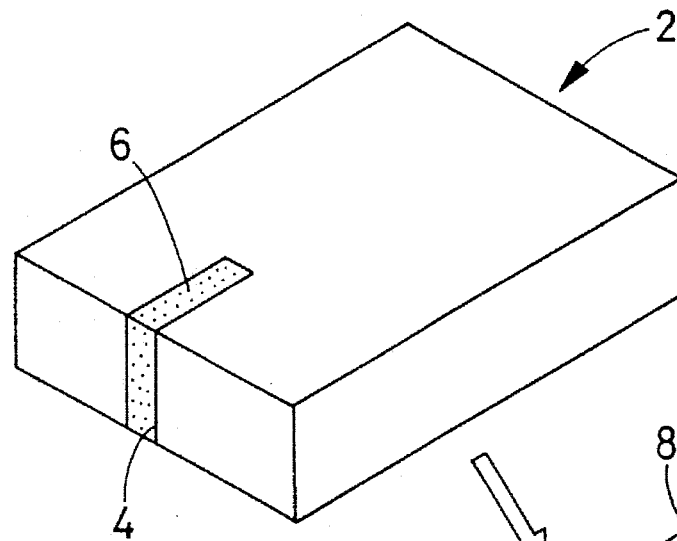
FIGS. 1(a), 1(b) and 1(c) are perspective views for explaining an example of a process of preparing a slider body used in one embodiment of a method of the present invention for manufacturing a composite type magnetic head core slider for a rigid magnetic disk drive.
Figure 1B:
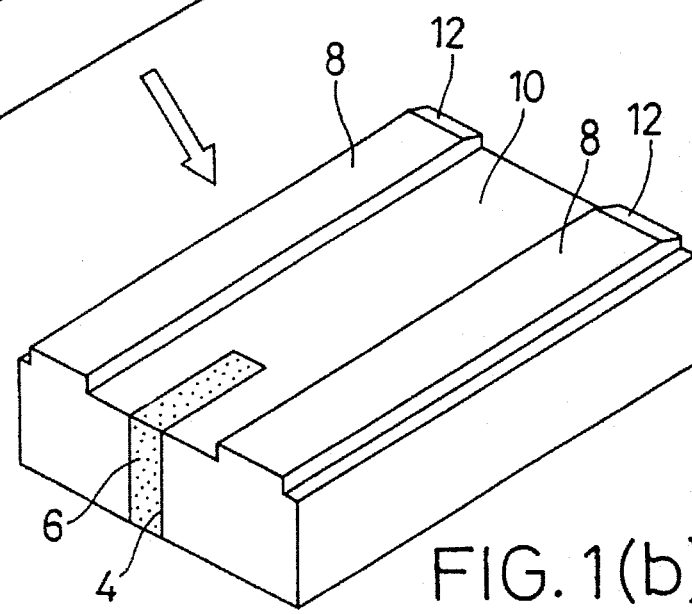
Figure 1C:
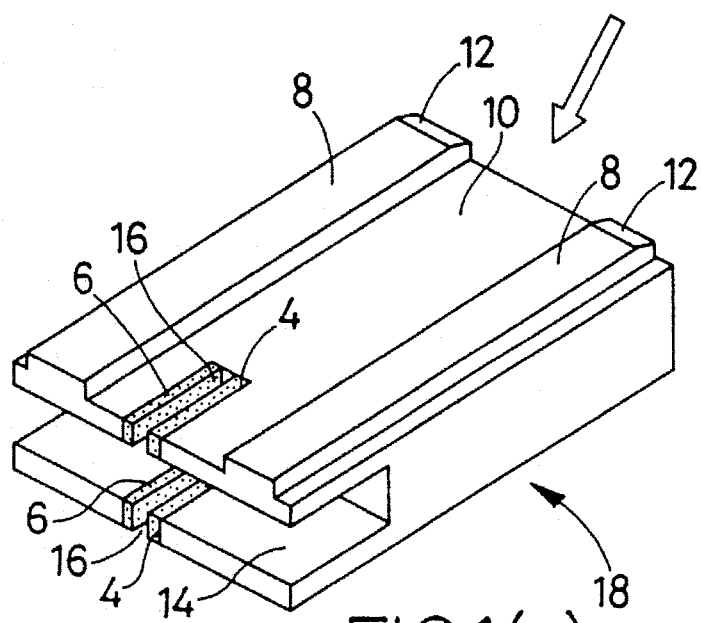

Referring first to FIGS. 1(a), 1(b) and 1(c), there is illustrated an example of a process in which a slider body 18 is prepared according to one embodiment of a method of the present invention for manufacturing a composite type magnetic head core slider for a rigid magnetic disk drive. In FIG. 1(a), reference numeral 2 denotes a blank in the form of a plate which gives the slider body 18 shown in FIG. 1(c). Generally, the slider blank 2 is made of $CaTiO_3$, or a non-magnetic ceramic material whose major component is $CaTiO_3$, for example. The blank 2 is processed to form a cutout 4 through one end portion thereof (at the trailing end portion) as seen in the direction of relative movement between the slider body 18 and a magnetic disk. The cutout 4 has a predetermined length dimension as measured in the direction of the above-indicated relative movement, and a predetermined width dimension as measured in the direction perpendicular to the direction of the relative movement. The width and length dimensions of the cutout 4 are selected to be larger than those of a core chip 20 (which will be described). The thus dimensioned cutout 4 is filled with a glass filler 6 in a manner known in the art, for bonding the core chip in the cutout 4, as described below. The blank 2 with the cutout 4 filled with the glass filler 6 is then subjected to a mechanical machining operation on one of the opposite major surfaces thereof, to form two parallel air-bearing portions 8, 8 in the form of rails, and a central recessed portion 10 disposed between the two air-bearing portions 8, as shown in FIG. 1(b). The magnetic head core slider including the slider body 18 is positioned relative to the magnetic disk such that the air-bearing portions 8 face the magnetic disk. The two air-bearing portions 8 have a predetermined height as measured from the surface of the central recessed portion 10. The cutout 4 is aligned with the center line of the central recessed portion 10, which is intermediate between the two air-bearing portions 8. The leading ends of the air-bearing portions 8 are machined to provide respective leading ramps 12, 12, in the same manner as used for forming leading ramps on the known slider body. The angle of inclination of the leading ramps 12 relative to the plane of the blank 2 is comparatively small.

The blank 2 is then subjected to an operation to form a coil-winding groove 14 through the trailing end portion through which the cutout 4 is formed. As indicated in FIG. 1(c), the groove 14 is parallel to the plane of the blank 2, extends in the direction perpendicular to the direction of extension of the air-bearing portions 8, and is open on the trailing end face of the blank 2. Further, the glass filler 6 in the remaining two portions of the cutout 4 is cut to form a slot 16 (more precisely, two aligned slot portions corresponding to the remaining two portions of the cutout 4), in which the core chip 20 is inserted as described below. The width of the slot 16 is smaller than that of the cutout 4. Thus, the slider body 18 is prepared.

Figure 2:
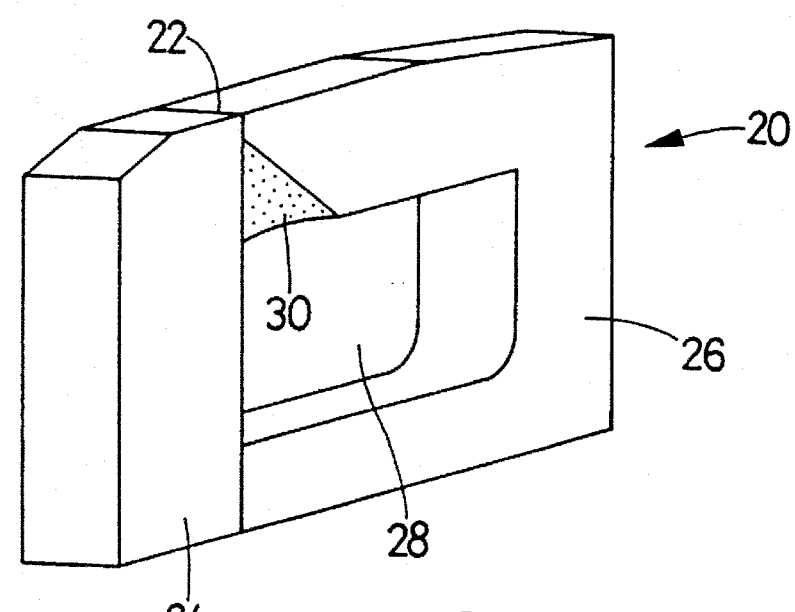
FIG. 2 is a perspective view showing a core chip used in the method indicated above with respect to FIG. 1.

On the other hand, the core chip 20 has a generally rectangular frame structure with a generally rectangular coil-winding aperture 28, as shown in FIG. 2. The upper side of the generally rectangular frame structure of the core chip 20 has a magnetic gap 22 formed therethrough for writing and reading information on the magnetic disk. The core chip 20 as shown in FIG. 2 has not yet been subjected to an operation to form a track portion. The core chip 20 is formed of ferrite or other magnetic material as used for the core chip of the known composite type magnetic head core slider. For example, the core chip 20 consists of an I-shaped ferrite member 24 and a C-shaped ferrite member 26 which are butted and bonded together at one end of the I-shaped ferrite member 24, to form a ring-shaped structure which has the generally rectangular coil-winding aperture 28 and a generally annular magnetic path defined in the presence of the aperture 28. The magnetic gap 22 is formed as a small amount of clearance between opposed surface portions of the I-shaped and C-shaped ferrite members 24, 26 which correspond to the other end of the I-shaped ferrite member 24. The thus formed magnetic gap 22 intersects the generally annular magnetic path of the core chip 20. Reference numeral 30 denotes a protective glass for protecting the magnetic gap 22. The core chip 20 may be prepared by any one of the known methods, for example, by a method as disclosed in U.S. patent application, Ser. No. 07/833,428 which corresponds to JP-A-4-259902. Like the core chip 20 as shown in FIG. 2, however, the core chip used according to the present invention should not have a finally shaped track portion.

Figure 3:
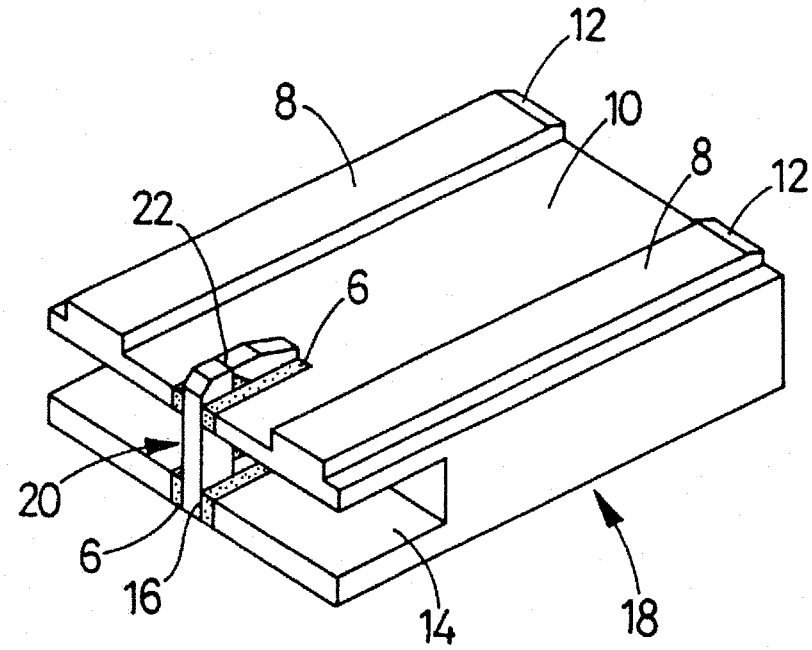
FIG. 3 is a perspective view showing an intermediate assembly in which the core chip of FIG. 2 is inserted and fixed in the slider body prepared by the process of FIG. 1.

The core chip 20 thus prepared is received in the slot 16 formed in the slider body 18, as shown in FIG. 3, and the slider body 18 and the core chip 20 are heated to soften or melt the glass filter 6, so that the core chip is bonded to the slider body 18 through the glass filler 6. When the core chip 20 is bonded to the slider body 18, the core chip 20 should be positioned relative to the slider body 18, such that the upper end portion of the core chip 20 through which the magnetic gap 22 is formed protrudes a predetermined distance from the surface of the central recessed portion 10 between the air-bearing portions 8, that is, the core chip 20 has a predetermined height from the surface of the central recessed portion 10, which height is selected so that the upper end portion of the core chip 20 which defines the depth of the magnetic gap 22 is visible, while being located above the surface of the recessed portion 10.

Then, the top surface of the core chip 20 above the surface of the central recessed portion 10 of the slider body 18 is ground together with the upper surfaces of the air-bearing portions 8, 8 of the slider body 18 which are to face the magnetic disk. The amount of this grinding (hereinafter referred to as "gap depth grinding" where appropriate) is determined to establish the desired depth (gap depth) of the magnetic gap 22. Since the portion of the core chip 20 which defines the magnetic gap 22 is located above the surface of the recessed portion 10, with the lower end of the gap 22 being visible sideways of the core chip 20, the depth of the magnetic gap 22 can be directly measured during the gap depth grinding operation, and the amount of the gap depth grinding required to obtain the desired or nominal gap depth can be easily found. Therefore, the positioning of the core chip 20 and the subsequent gap depth grinding operation on the core chip 20 permit accurate control of the depth dimension of the magnetic gap 22 as measured in the direction of protrusion of the upper end portion of the core chip 20 above the surface of the central recessed portion 10. The depth dimension is a distance between the ground top surface of the core chip 22 and the upper end of the coil-winding aperture 28 which defines the lower end of the gap 22. Thus, the core chip 22 has significantly improved accuracy of the depth dimension of the magnetic gap 22 with respect to the nominal gap depth dimension. As a result of the gap depth grinding thus performed, the top surface of the ground core chip 22 on which the magnetic gap 22 is open has the same height dimension as the upper surfaces of the air-bearing portions 8 which are ground concurrently with the core chip 22.

Figure 4:
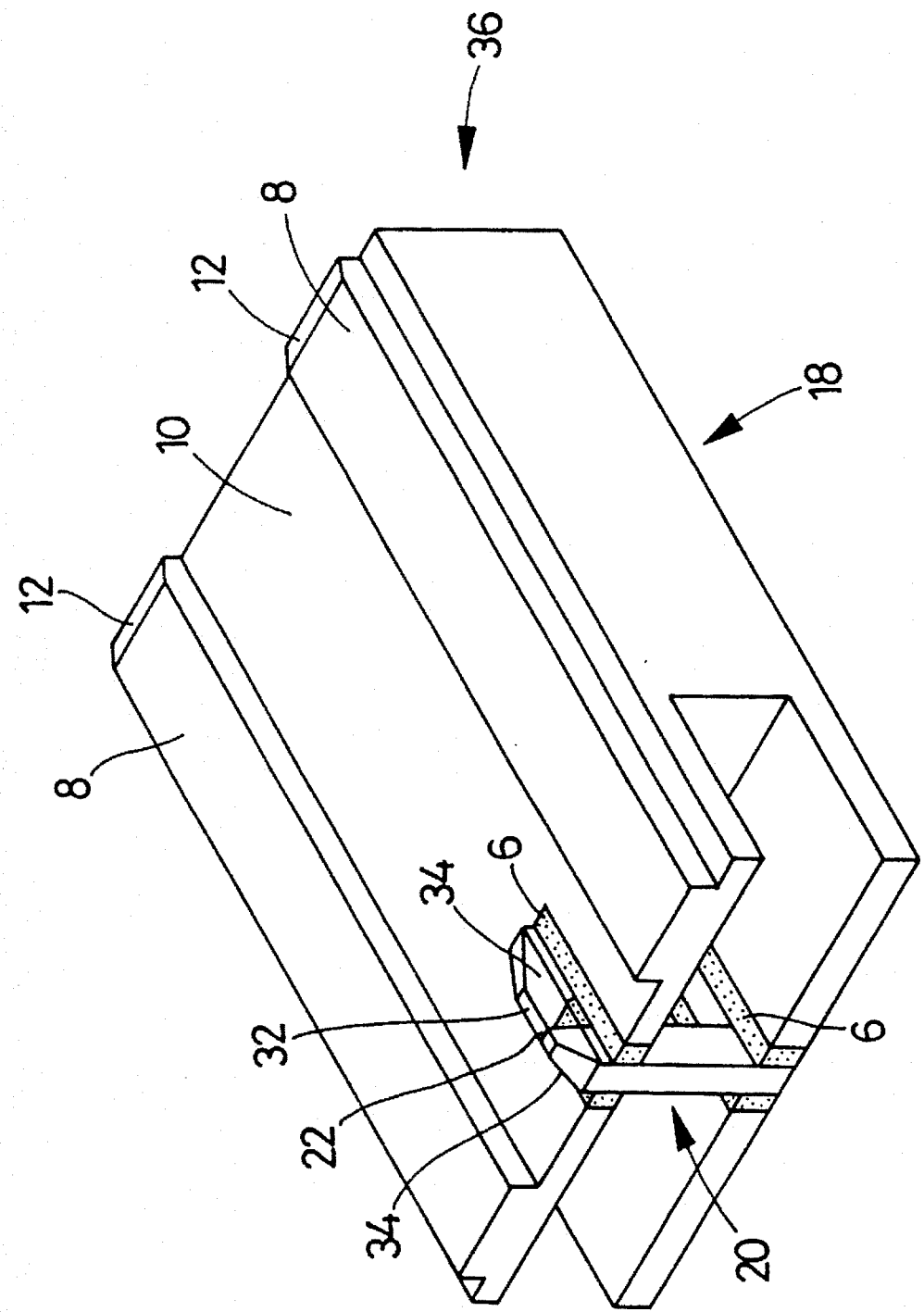
FIG. 4 is a perspective view of the magnetic head core slider produced by grinding and machining operations on the assembly of FIG. 3 to establish a desired depth of a magnetic gap of the core chip and shape a track portion of the core chip.

The gap depth grinding operation is followed by an operation on the core chip 20, to form a track portion 32 with a predetermined width dimension, as indicated in FIG. 4. The track portion 32 has a leading part and a trailing part on the opposite sides of the magnetic gap 22. That is, the leading and trailing parts of the track portion 32 are spaced apart from each other by the magnetic gap 22. Explained in detail, the upper end portion of the core chip 22 which defines the magnetic gap 22 and which protrudes in the central recessed portion 10 between the left and right air-bearing portions 8 is subjected to a mechanical machining operation to form the track portion 32 which has a relatively small width (as measured in the direction perpendicular to the direction of extension of the air-bearing portions 8). Preferably, the parallel edges of the top surface of the core chip 22 which are parallel with the air-bearing portions 8 are chamfered by mechanical machining, to provide inclined or chamfered surfaces 34, 34, which define the track portion 32 whose width decreases in the upward direction toward the top face. This track portion 32 having the gradually decreasing width is effective to concentrate the magnetic flux on a local spot on the magnetic disk, and thereby ensure enhanced operating characteristics of the magnetic head, such as an increased output level of the magnetic head. Although the track portion 32 in this specific example is defined by the two chamfered surfaces 34, 34, the track portion may be defined by a single chamfered surface 34 formed on one side of the protruding upper end portion of the core chip 22, which corresponds to one of the two air-bearing portions 8. In this case, the magnetic head has a similar advantage as described above.

With the track portion 32 formed on the core chip 20 as described above, a composite magnetic head core slider as generally indicated at 36 in FIG. 4 is eventually obtained. Since the depth dimension of the magnetic gap 22 can be measured during the gap depth grinding operation by observing the opposite side surfaces of the visible upper end portion of the core chip 22 protruding above the surface of the central recess portion 10, the depth dimension of the magnetic gap 22 can be controlled to be exactly equal to the desired or nominal value. In addition to this important advantage, the method of manufacturing the head core slider 36 as described above provides another advantage that the glass filler 6 for bonding the core chip 20 to the slider body 10 is exposed on the surface of the central recessed portion 10 between the left and right air-bearing portion 8, but is not present adjacent to the top surface of the track portion 32 of the core chip 20, which top surface is flush with the air-bearing portions 8 over which the magnetic disk rotates in a flying or air-bearing fashion with an air spacing therebetween. Thus, the magnetic disk is protected from contacting the glass filler 6 exposed on the surface of the recessed portion 10, which is spaced a sufficient distance from the upper surfaces of the air-bearing portions 8. Accordingly, the present magnetic head core slider 36 is totally free from sticking to the magnetic disk, which would occur due to direct contact of the glass filler 6 with the magnetic disk even when the disk is at rest. Thus, the reliability of the magnetic head is appreciably enhanced.

Further, since the track portion 32 is formed after the gap depth grinding operation is performed on the core chip 20 so as to determine the desired depth dimension of the magnetic gap 22, the width of the track portion 32 would not vary with the specific amount of the gap depth grinding. Accordingly, the present method effectively eliminates a variation in the characteristics of the magnetic head between the individual magnetic head core sliders manufactured. Moreover, the mechanical machining to form the track portion 32 makes it possible to minimize the width of the track portion 32, for instance, as small as 7 μm or less.

In particular, the track portion 32 whose width is accurately determined by the chamfered surfaces 34 formed on the opposite sides of the upper end portion of the core chip 20 assures an increased output level of the magnetic head, which is also an important feature of the instant method of manufacturing the composite type magnetic head core slider.

While the magnetic head core slider 36 shown in FIG. 4 has the various advantages as described above, it is preferable to further process the head core slider 36 according to a second embodiment of this invention, in order to further improve the operating characteristics of the magnetic head, particularly, the air bearing property with respect to the magnetic disk. Described more specifically, it is preferable to cut the magnetic head core slider 36, along cutting lines indicated by one-dot chain line in FIG. 5, to thereby remove parts of the trailing end portion of the slider body 18 which defines the coil-winding groove 14. More precisely, the trailing end portion of the slider body 18 is separated by the groove 14 into two opposed thickness portions 18a, 18b which are opposed to each other in the direction of thickness of the slider body 18, namely, in the direction which is perpendicular to the direction of extension of the air-bearing portions 8 and also perpendicular to the direction of extension of the coil-winding groove 14. The two opposed thickness portions 18a, 18b are connected by the core chip 20 received in the slot 16. Parts of these two thickness portions 18a, 18b of the slider body 18 which are relatively remote from the core chip 20 are removed by a suitable known machining operation, so that two pairs of chip support arms 38 are formed or left on the slider body 36, as shown in FIG. 6. These two pairs correspond to the above-indicated thickness portions 18a, 18b of the slider body 18 which define the coil-winding groove 14, and each pair consists of the two chip support arms 38 located on the opposite sides of the core chip 20, each arm 38 having a suitable width as measured in the direction perpendicular to the direction of extension of the air-bearing portions 8. In the magnetic head core slider 36 of FIG. 6, the two pairs of chip support arms 38 can be considered as integral extensions from the trailing end of the slider body 18, which extensions define the slot 16 and support the core chip 20. It will be understood that the chip support arms 38 are spaced some distance from the air-bearing portions 8 in the direction perpendicular to the direction of extension of the air-bearing portions 8. It will also be understood that the chip support arms 38 extend from a plane which includes the end faces of the air-bearing portions 8. The upper two chip support arms 38 have the same height as the surface of the central recessed portion 10.

The slider body 18 of the thus modified magnetic head core slider 36 as shown in FIG. 6 does not have large trailing end thickness portions 18a, 18b which still define the coil-winding groove 14 and which are not connected by the core chip 20. In other words, the slider body 18 of the head core slider 36 of FIG. 6 does not have portions which are likely to undergo buckling, warpage or flexure. Accordingly, the air-bearing portions 8 are effectively protected against such buckling, warpage or flexure, and the flatness of the air-bearing portions 8 is therefore improved. Thus, the present arrangement is advantageously effective to avoid the conventionally experienced deterioration of the air-bearing property of the head core slider with respect to the magnetic disk, and deterioration of the operating characteristics of the magnetic head.

Figure 6:
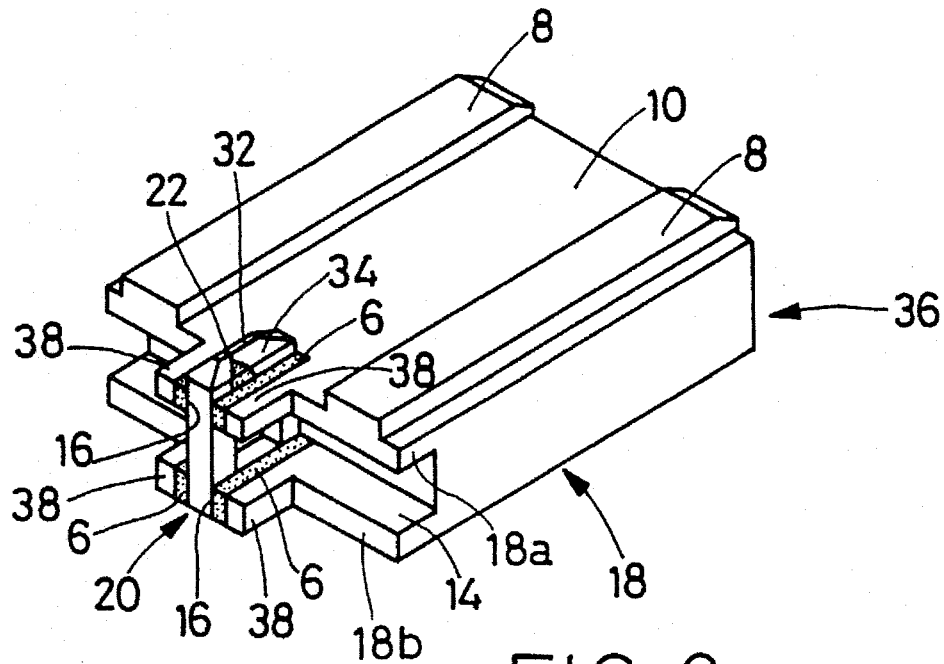
FIG. 6 is a perspective view of the magnetic head core slider having chip support arms formed as a result of cutting along the cutting lines of FIG. 5.
Figure 7:
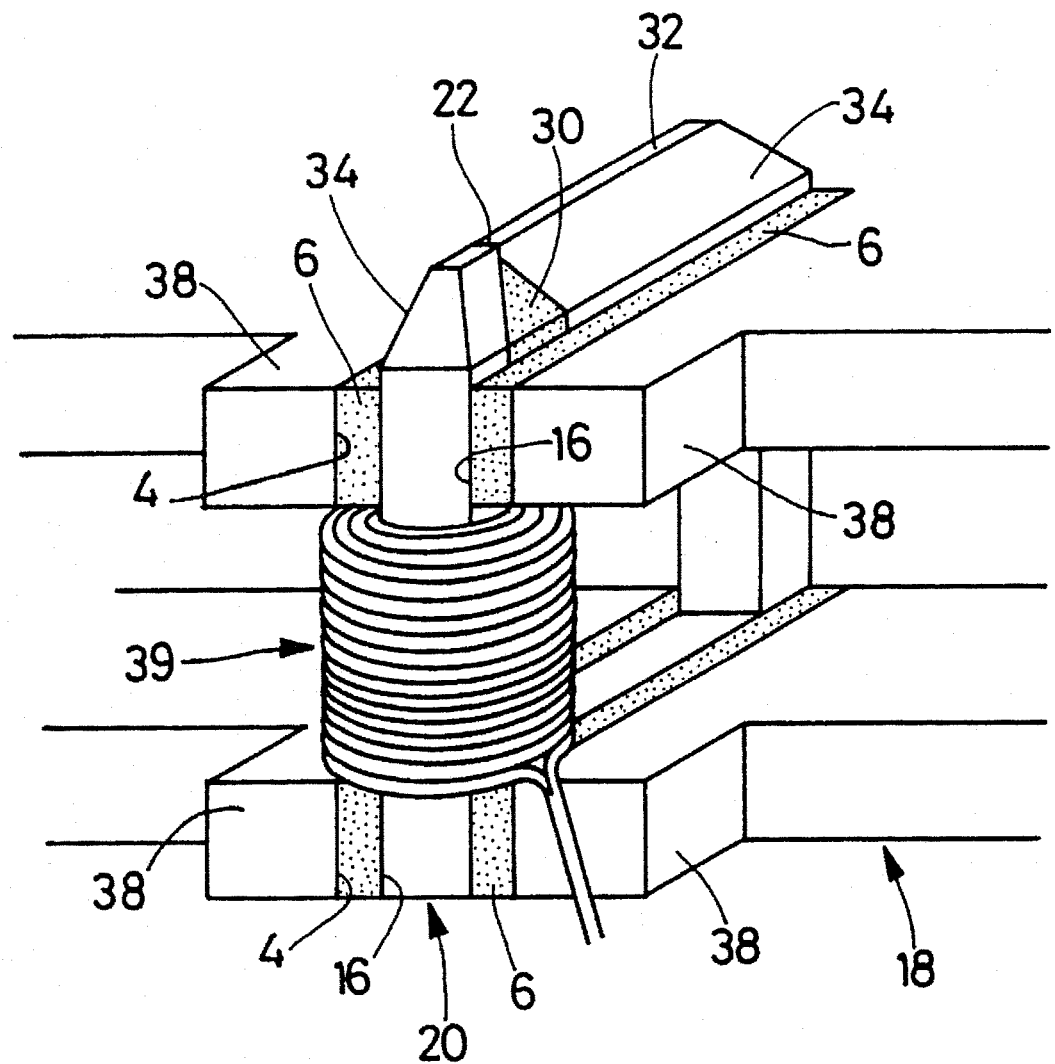
FIG. 7 is an enlarged fragmentary perspective view showing the magnetic head core slider of FIG. 6 as provided with a coil wound on the core chip.

In the composite type magnetic head core slider 36 of FIG. 6 according to the second embodiment, the two chip support arms 38 are disposed on the opposite sides of the core chip 20, and at the upper and lower end portions of the core chip 20, as indicated in enlargement in FIG. 7. The four chip support arms 38 cooperate with a portion of the core chip 20 (I-shaped ferrite member 24 shown in FIG. 2) to function as a bobbin for retaining a coil 39 in place. The chip support arms 38 eliminates an exclusive bobbin and facilitates an operation of winding the coil 39 round the I-shaped ferrite member 24 of the core chip 20, while preventing irregular or disorderly winding of the coil 39.

Although the two chip support arms 38 integrally extending from the slider body 18 are disposed on each of the opposite sides of the core chip 20, the two chip support arms 38 may be disposed on only one side of the core chip 20. Namely, only parts of the opposed thickness portions 18a, 18b which are located on one side of the core chip 20 as viewed in the direction of extension of the coil-winding groove 14 may be removed to provide the chip support arms 38 on only that one side of the core chip 20. In the illustrated embodiment of FIGS. 5 and 6, the parts of the two opposed thickness portions 18a, 18b of the trailing end portion of the slider body 18 which define the coil-winding groove 14 are partially removed, with an inner portion of the groove 14 being left unremoved, as indicated in FIG. 6. That is, if the depth of the groove 14 is defined as a dimension as measured in the direction of extension of the air-bearing portions 8, the inner parts of the thickness portions 18a, 18b which define the bottom portion of the groove 14 and which are relatively remote from the core chip 20 in the direction perpendicular to the direction of extension of the air-bearing portions 8 are left unremoved. However, the thickness portions 18a, 18b corresponding to the entire depth of the groove 14 may be removed. Further, only one of the two opposed thickness portions 18a, 18b may be removed. In particularly, only the upper thickness portion 18a which has parts the air-bearing portions 8 may be removed. In this case, two chip support arms 38 are formed on both sides of the core chip 20 and adjacent to the central recessed portion 10. All the above modifications are effective to prevent buckling, warpage or flexure of the air-bearing portions 8. The width of each chip support 38 as measured in the direction perpendicular to the direction of extension of the air-bearing portions 8 may be suitably determined so as to prevent the buckling, warpage or flexure of the slider body 18 particularly at its air-bearing portions 8.

Figure 5:
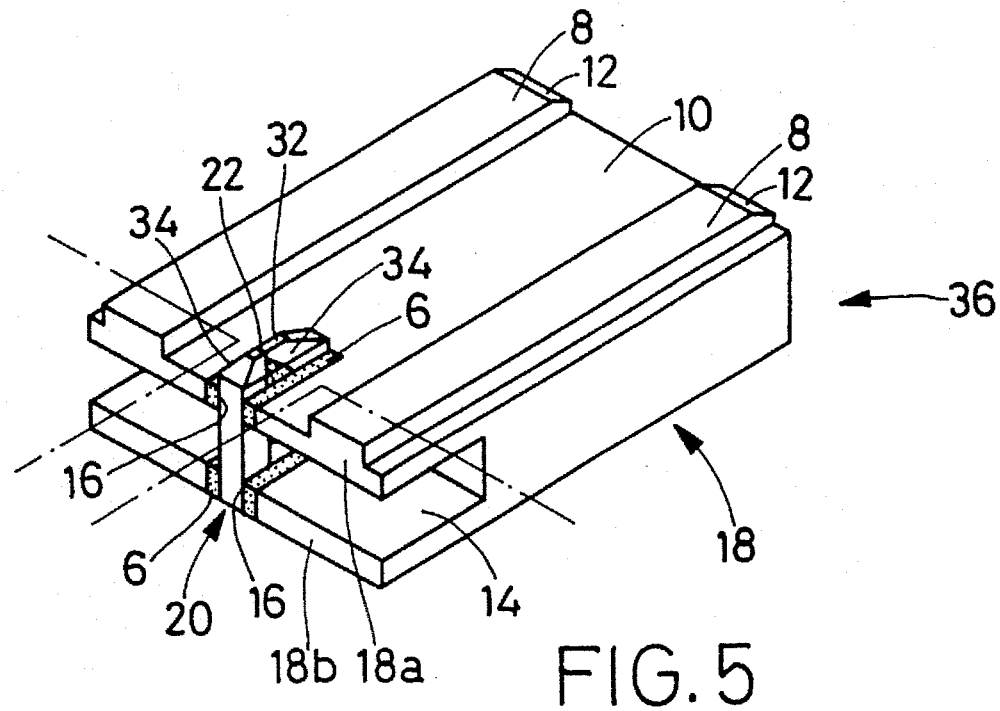
FIG. 5 is a perspective view indicating cutting lines along which the magnetic head core slider of FIG. 4 is cut to remove parts of a portion of the slider body which defines a coil-winding groove, according to another embodiment of this invention.
Figure 16:
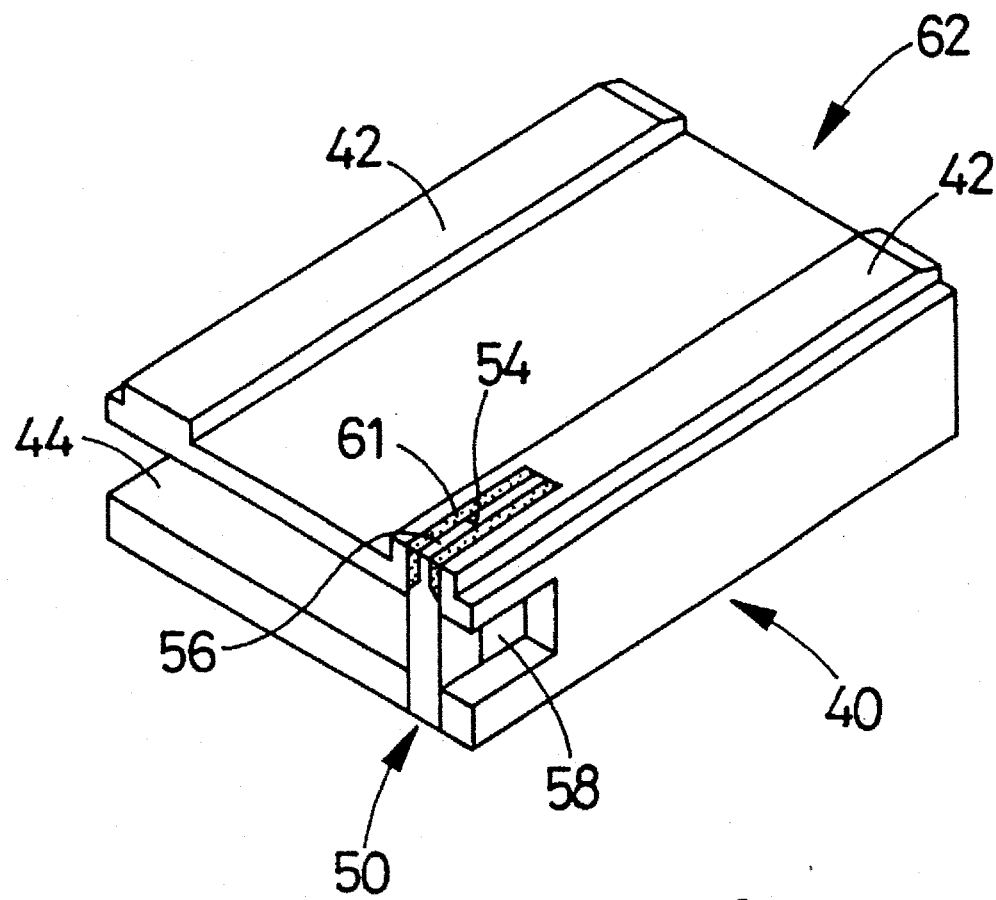
FIG. 16 is a perspective view of the magnetic head core slider manufactured by the method of FIGS. 15(a), 15(b) and 15(c).

Although the principle of removing parts of the trailing end portion of the slider body 18 to provide the chip support arms 38 is advantageously applicable to a composite magnetic head core slider of the type in which the core chip 20 is positioned intermediate between the left and right air-bearing portions 8 of the slider body 18 as in the embodiment of FIGS. 5–6, the principle is equally applicable to the magnetic head core slider 62 shown in FIG. 16 in which the core chip 50 is aligned with one of the two air-bearing portions 42. In this instance, a part or parts of one or both of the two opposed thickness portions which defines/define the groove 44 and which is/are relatively remote from the core chip 50 is/are removed to provide at least one chip support arm or arm on one side or both sides of the core chip 50.

Referring next to FIGS. 8–12, there will be described a third embodiment of the present invention. The same reference numerals as used in FIGS. 1–7 will be used in FIGS. 8–12 to identify the functionally corresponding components or elements.

An example of a process of preparing the core chip 20 according to the present embodiment will be first described by reference to FIGS. 8(*a*) through 8(*f*). In FIG. 8(*a*), reference numerals 23 and 25 denote blocks of a magnetic materials such as ferrite which eventually give the core chip 20 shown in FIG. 8(*f*). One or both of these two blocks 23, 25 is/are subjected to a suitable grooving operation to form a groove corresponding to the coil-winding aperture 28, and a gap forming operation to eventually provide the magnetic gap 22. In the present specific example, the block 23 is an I-shaped member which is not subjected to the grooving or gap forming operation, while the block 25 is a C-shaped member which is subjected to a grooving operation to form a longitudinal groove 28*a* for the aperture 28. One of the two longitudinal surface areas of the C-shaped member 25 which are located on both sides of the groove 28*a* is subjected to a suitable gap forming operation to reduce its height as compared with the other longitudinal surface area. The I-shaped and C-shaped members are butted and bonded together into an integral gapped bar 19 as shown in FIG. 8(*b*). The gapped bar 19 has a longitudinal opening 28*b* corresponding to the groove 28*a*, and a longitudinal clearance 22*a* which is defined by the longitudinal surface area of the C-shaped member 25 whose height is reduced, and a corresponding surface area of the I-shaped member 23. The opening 28*b* and clearance 22*a* correspond to the coil-winding groove 28 and the magnetic gap 22 of the core chip 20 of FIG. 8(*f*), respectively, as is apparent from the following description. The gapped bar 19 has an annular magnetic path in the presence of the opening 28*b* defined by the I-shaped and C-shaped members 23, 25 which are bonded together. The gapped bar 19 is further processed as described below, to provide a plurality of core chips 20. The clearance 22*a* and the apex or upper portion of the opening 28*b* are filled by the protective glass 30 for reinforcing or protecting the corresponding portions of the core chip 20 eventually produced.

Subsequently, the four surfaces of the gapped bar 19, namely, the upper and lower surfaces and the left and right surfaces as seen in FIG. 8(*b*) are ground. The upper surface on which the clearance 22*a* is open corresponds to the sliding surface of the core chip 20 which is to face the magnetic disk. This upper surface of the gapped bar 19 is subjected to the gap depth grinding operation to establish a predetermined depth of the clearance 22*a* which corresponds to the desired final depth dimension of the magnetic gap 22 of the core chip 20. Since the depth of the clearance 22*b* of the gapped bar 19 can be readily measured at the end faces of the gapped bar 19 during the gap depth grinding operation in the step of FIG. 8(*c*), the depth of the eventually obtained core chip 20 can be accurately controlled to the nominal value.

Then, the upper left corner of the ground gapped bar 19 as seen in FIG. 8(*c*) is subjected to a chamfering operation to form a chamfer 27 as shown in FIG. 8(*d*). The chamfer 27 corresponds to the leading end of the track portion 32 of the core chip 20 which is subsequently formed as described below by reference to FIG. 12. The chamfered gapped bar 19 of FIG. 8(*d*) is then cut as indicated by dashed lines in FIG. 8(*e*), whereby a plurality of core chips 20 of FIG. 8(*f*) are prepared. Usually, several tens of core chips 20 are produced from a single gapped bar 19. It is noted that the core chip 20 thus prepared has the magnetic gap 22 with the desired depth dimension, but does not have the finally shaped track portion 32 with the desired width dimension.

On the other hand, the slider body 18 as shown in FIG. 9 is prepared in a manner similar to that described above by reference to FIGS. 1(*a*), 1(*b*) and 1(*c*) with respect to the first embodiment of FIGS. 1–4. Unlike the slot 16 defined by the glass filler 6 in the first embodiment, the slot 16 is directly defined by the material of the slider body 18 in the present third embodiment, in which the glass filler 6 is not present. The slot 16 is open on the trailing end face of the slider body 18, and located within the width of the central recessed portion 10. The slot 16 has a width substantially equal to the wall thickness of the core chip 20 (width of the track portion 32).

The core chip 20 is inserted in the slot 16 of the slider body 18 as indicated by an arrow in FIG. 9. The core chip 20 is positioned and fixed such that the top surface of the core chip 20 on which the magnetic gap 22 is open is flush with the surfaces of the air-bearing portions 8 of the slider body 18, as shown in FIG. 10.

Described in detail, the slider body 18 with the core chip 20 inserted in the slot 16 is placed on a surface plate 35 having a sufficiently high degree of flatness, such that the surfaces of the air-bearing portions 8 of the slider body 18 and the top surface of the core chip 20 are in contact with the surface of the surface plate 35, as indicated in FIG. 10. In this condition, the core chip 20 is bonded to the slider body 18 by a suitable adhesive or bonding agent. This bonding of the core chip 20 to the slider body 18 is effected while the slider body 18 and the core chip 20 are held pressed against the surface plate 38 by a suitable force so that the surfaces of the air-bearing portions 8 and the top surface of the core chip 20 lie in the same plane, that is, are kept in close contact with the surface plate 35. The adhesive may be applied to the inner surfaces of the slider body 18 which define the slot 16, and/or the corresponding outer surfaces of the core chip 20, before the core chip 20 is positioned in the slot 16. Alternatively, the adhesive is forced into the clearance between the core chip 20 and the inner surfaces of the slot 16, after the core chip 20 is positioned in the slot 16.

Any known adhesive may be used provided the adhesive provides a sufficient strength of bonding between the slider body 18 and the core chip 20. However, an epoxy resin adhesive in a liquid phase or a water glass adhesive is preferably used. When an epoxy resin adhesive is used, the bonding is effected by applying heat to the bonding portion to cure or set the epoxy resin. When a water glass adhesive is used, the adhesive is heated and dried effect the bonding.

Thus, the core chip 20 is positioned and fixed in the slot 16 of the slider body 18 such that the upper end portion of the core chip 20 protrudes above the surface of the central recessed portion 10 between the left and right air-bearing portions 8 of the slider body 18, as shown in FIG. 11. Then, the protruding end portion of the core chip 20 having the magnetic gap 22 is subjected to a suitable operation to form the track portion 32 as shown in FIG. 12. The track portion 32 has the leading and trailing parts on the opposite sides of the magnetic gap 22. These leading and trailing parts of the track portion 32 are spaced apart from each other by the magnetic gap 22. In the present example, the opposite side edges of the protruding upper end portion of the core chip 20 are mechanically machined to form two chamfered surfaces 34, 34, which define the width of the top surface of the track portion 32 as measured in the direction perpendicular to the direction of extension of the air-bearing portions 8. In the presence of the chamfered surfaces 34, 34, the width of the track portion 32 decreases in the upward direction toward the top surface, as seen in FIG. 12.

As in the first embodiment of FIGS. 1–4, the core chip 20 which has been subjected to the gap depth grinding to establish the desired depth of the magnetic gap 22 is processed to form or finally shape the track portion 32 so that the track portion 32 has the desired width. Accordingly, the width of the track portion 32 does not deviate from the desired or nominal value, even when the nominal width value is considerably small. Thus, the method according to the present embodiment of FIGS. 8–12 has the same advantages as the method according to the first embodiment of FIGS. 1–4. In addition, the present embodiment has an advantage which accrues from the gap depth grinding operation performed on the gapped bar 19 from which a relatively large number of core chips 20 are prepared. Namely, the depth dimension of the magnetic gap 22 of each of those core chips 20 is established by a single grinding operation to establish the predetermined depth dimension of the longitudinal clearance 20a formed in the single gapped bar 19. Therefore, the present method permits considerable reduction in the overall grinding time for a given lot of the core chips 20, and an increased yield ratio of the core chips 20, as compared with the method in which a gap depth grinding operation is effected on each core chip 20 fixedly positioned in the slider body 18.

Further, the use of an epoxy resin or water glass adhesive to bond the core chip 20 to the slider body 18 permits significantly reduced time and cost for the bonding.

In the first embodiment of FIGS. 1–4 and the third embodiment of FIGS. 8–12, the leading ramps 12 having slightly inclined surfaces are formed at the leading ends of the air-bearing portions 8, 8 on the slider body 18, before the core chip 20 is positioned and fixed in the slider body 18. However, the leading ramps 12 may be formed after the core chip 20 is positioned and fixed in the slider body 18. Further, trailing ramps may be formed as needed at the trailing ends of the air-bearing portions 8, 8. Although the core chip 20 is given a trailing ramp 29 before the core chip 20 is inserted and fixed in the slider body 18, as indicated in FIG. 9, this trailing ramp 29 is not essential. The trailing ramp 29 may be formed after the core chip 20 is fixed in the slider body 18, and concurrently with the trailing ramps at the trailing ends of the air-bearing portions 8.

Figure 13A:
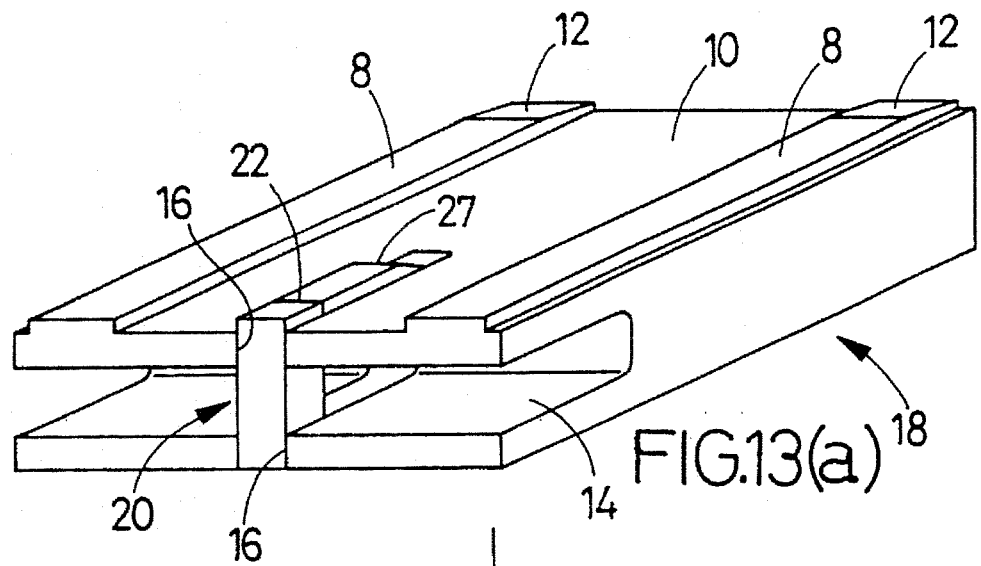
FIGS. 13(a), 13(b) and 13(c) are perspective views indicating process steps according to a still further embodiment of this invention, in which an intermediate assembly of a slider body and a core chip fixedly inserted in the slider body is machined to form trailing ramps and then the core chip is machined to shape its track portion, to produce a magnetic head core slider.
Figure 13B:
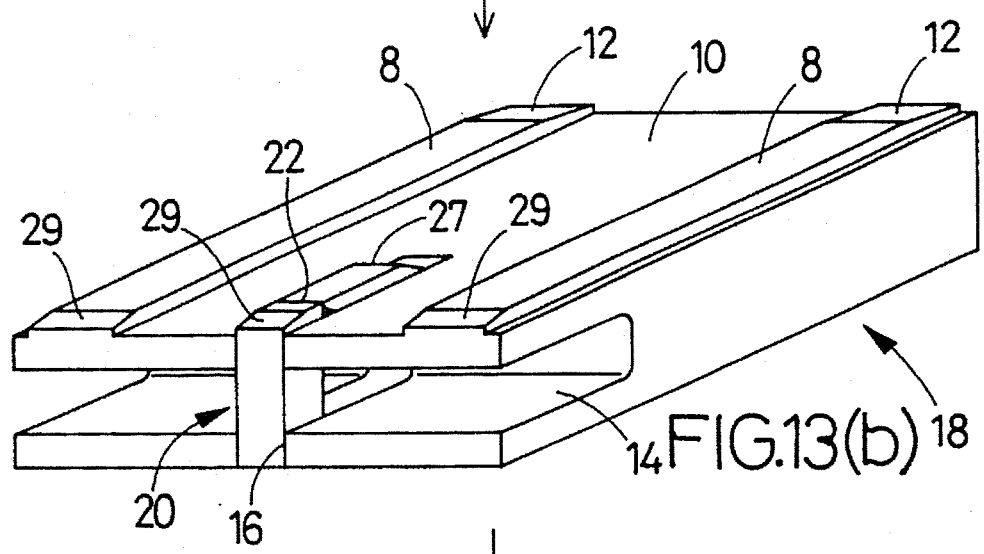
Figure 13C:
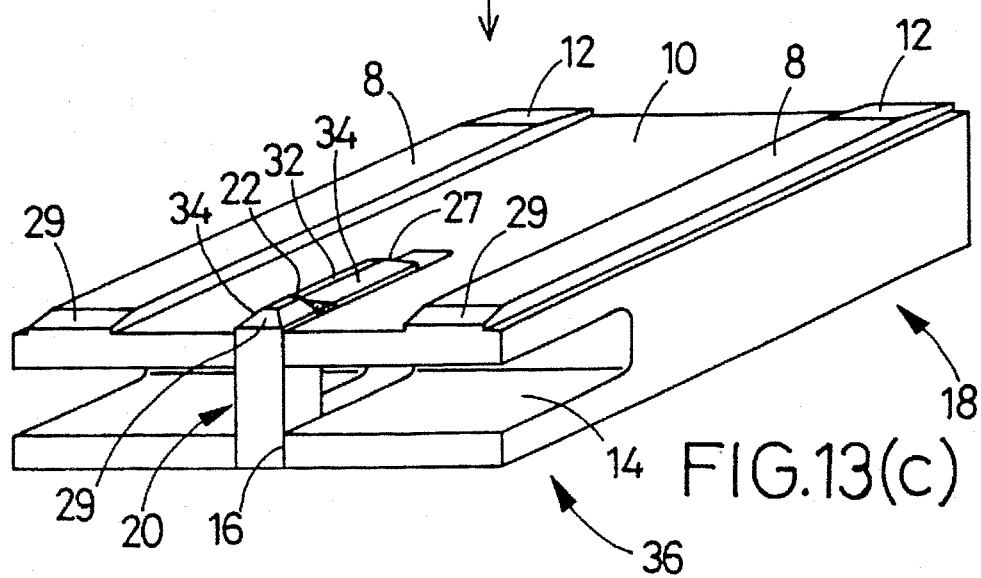

FIGS. 13(a), 13(b) and 13(c) show a fourth embodiment of the invention, which is a modification of the method according to the third embodiment. In this fourth embodiment, the trailing ramps 29 are formed concurrently at the trailing ends of the core chip 20 and the air-bearing portions 8, 8 of the slider body 18, after the core chip 20 is fixed in the slider body 18. Described more specifically, the core chip 20 is positioned and fixed in the slot 16 of the slider body 18, as indicated in FIG. 13(a), in the same manner as in the third embodiment, using the surface plate 35 and a suitable adhesive. Then, the trailing ends of the core chip 20 and air-bearing portions 8 of the slider body 18 are subjected to a concurrent operation to form the trailing ramps 29, as indicated in FIG. 13(b). Finally, the upper end portion of the core chip 20 which protrudes above the surface of the recessed portion 10 and which has the magnetic gap 22 is subjected to an operation to form the two chamfered surfaces 34, 34 which define the track portion 32 having a desired width at its top surface which is to face the magnetic disk.

Figure 14:
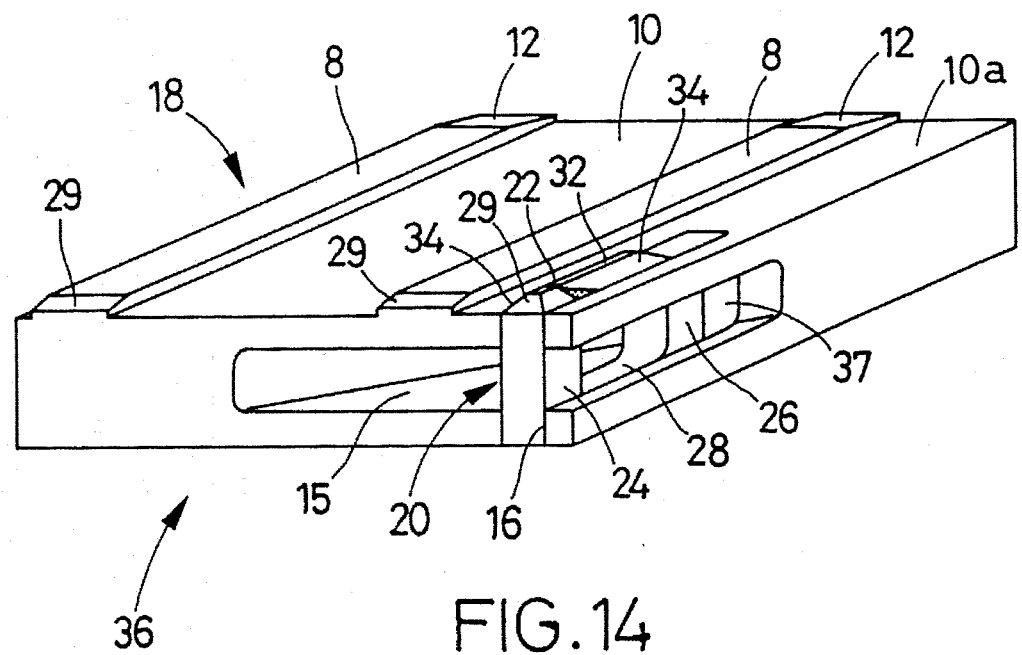
FIG. 14 is a perspective view of a composite type magnetic head core slider manufactured according to a yet further embodiment of the invention.

In the first, third and fourth embodiments, the slot 16 is located within the width of the central recessed portion 10 intermediate between the two air-bearing portions 8, 8, such that the slot 16 has a predetermined length as measured in the direction of extension of the air-bearing portions 8. However, the slot 16 is located within the width of an outer recessed portion 10a formed on one side of the right or left air-bearing portion 8 which is remote from the central recessed portion 10, in the direction perpendicular to the direction of extension of the air-bearing portions 8, as shown in FIG. 14. The air-bearing portion 8 adjacent to the outer recessed portion 10a corresponds to a relatively radially outer portion of the magnetic disk, while the other air-bearing portion 8 corresponds to a relatively radially inner portion of the magnetic disk, so that the surface area of the magnetic disk can be effectively utilized for storage of information, and the storage capacity of the disk is accordingly increased when used with the magnetic head core slider 36 of FIG. 14, as compared with the storage capacity when the disk is used with the magnetic head core slider 36 of FIGS. 4, 12 or 13(c) in which the core chip is located within the width of the central recessed portion 10.

In the composite type magnetic head core slider 36 of FIG. 14 according to a fifth embodiment of this invention, a coil-winding groove 15 through a corner portion of the slider body 18 through which the slot 16 is formed. The coil-winding groove 15 is triangular in cross section in a plane parallel to the plane of the slider body 18, and intersects the slot 16. The groove 15 is open on the trailing end face of the slider body 18 and the adjacent side face which is adjacent to the surface of the outer recessed portion 10a. The groove 15 is dimensioned such that the depth of the groove 15 as measured in the direction of extension of the air-bearing portions 8 along a line aligned with the center of width of the core chip 20 (as measured perpendicular to the direction of extension of the air-bearing portions 8) is larger than the length of the core chip 20 as measured in the direction of extension of the air-bearing portions 8. The groove 15 and the slot 16 are dimensioned so that these groove and slot 15, 16 provide an ample space that allows coils to be wound on the intermediate portions of the I-shaped and C-shaped members 24, 26 of the core chip 20 as positioned and fixed in the slot 16. Namely, the groove 15 should provide an ample space around each of the intermediate portions of these I-shaped and C-shaped members 24, 26 which cooperate to define the magnetic gap 22 therebetween. In particular, the groove 15 and the slot 16 cooperate to provide a space 37 between the intermediate portion of the C-shaped member 26 and the surfaces which define the bottom of the groove 15 and the leading end of the slot 16 remote from the trailing end face of the slider body 18. This arrangement permits a coil to be readily wound on the intermediate portion of the C-shaped member 26, as well as a coil wound on the intermediate portion of the I-shaped member 24.

In the composite type head core slider 36 of FIG. 14 according to the fifth embodiment, the inductance of the core chip 20 is appreciably reduced, and the induction noise is effectively minimized, owing to a so-called "balanced arrangement" of the two coils wound on the intermediate portions of the I-shaped and C-shaped members 24, 26 of the core chip 20 disposed within the groove 15, which members 24, 26 cooperate to define the magnetic gap therebetween.

In the fifth embodiment of FIG. 14, the coil-winding groove 15 takes the form of a triangular recess or cavity open on the trailing end face of the slider body 18 and the neighboring side face adjacent to the outer recessed portion 10a. This configuration of the groove 15 is effective to reduce or minimize the warpage or flexure of the portion of the slider body 18 which defines the coil-winding groove. However, the triangular groove 15 used in the magnetic head core slider 36 of FIG. 14 may be replaced by a groove similar to the groove 14 which has a constant depth and which extends in the direction perpendicular to the direction of extension of the air-bearing portions 8, as in the first through fourth embodiments.

While the presently preferred embodiments of the present invention has been described above in detail by reference to the accompanying drawings, for illustrative purpose only, it is to be understood that the invention is not limited to the details of the illustrated embodiments, but may be embodied with various changes, modifications and improvements, which may occur to those skilled in the art without departing from the spirit of the invention.

Figure 15A:
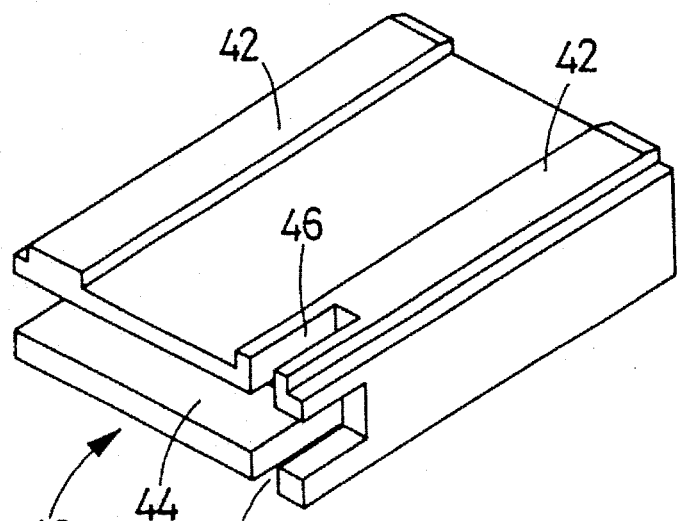
FIGS. 15(a), 15(b) and 15(c) are perspective views for explaining an example of a known method of manufacturing a composite type magnetic head core slider for a rigid magnetic disk drive.
Figure 15B:
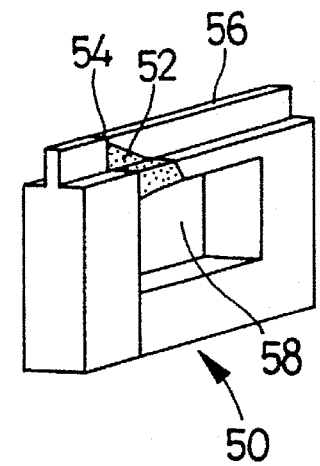
Figure 15C:
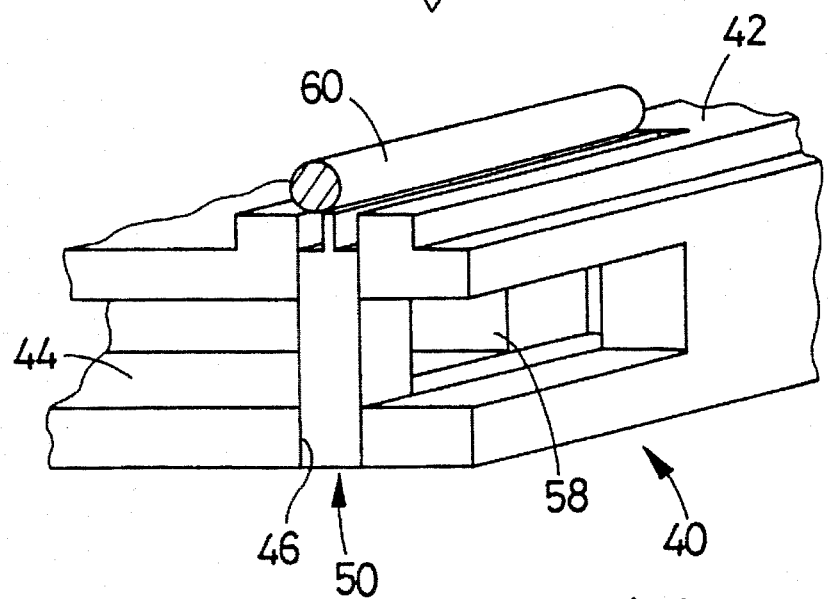

In the first and second embodiments, the core chip 20 is positioned in the slot 16 which is defined by the glass filler 6 which initially fills the cutout 4 formed in the slider body 18, and the core chip 20 is bonded to the slider body 18 by the glass filler 6 softened or melted by heat application. However, the core chip 20 may be bonded to the slider body 18 by first positioning the core chip 20 in the slot defined by the material of the slider body 18, and then softening or melting a glass rod placed over the core chip 20 positioned in the slot, as practiced in the prior art illustrated in FIG. 15. Alternatively, the first embodiment may be modified to apply a suitable adhesive such as an epoxy resin adhesive or a water glass adhesive to the core chip 20 positioned in the slot defined by the material of the slider body 18, as in the third, fourth and fifth embodiments.

Further, the core chip 20 need not be accommodated in the slot 15, 16 over its entire length as measured in the direction of extension of the air-bearing portions 8, but the core chip 20 positioned and fixed in the slot 15, 16 may project some distance beyond the trailing end face of the slider body 18, as needed.

The core chip 20 may be a metal-in-gap (MIG) type. That is, the magnetic gap 22 may be filled with a metallic material. In this case, a metallic layer is formed on one or both of opposite surfaces which define the gap 30.

While the track portion 32 has the two chamfered surfaces 34, 34 are formed on the track portion 32, the track portion may have a single chamfered surface 34.

In the embodiment of FIG. 14, a coil may be wound on only the I-shaped member 24 of the core chip 20, rather than on each of the I-shaped and C-shaped members 24, 26.

What is claimed is:

1. A method of manufacturing a composite type magnetic head core slider for a rigid magnetic disk drive, comprising the steps of:

providing a slider body having a pair of parallel air-bearing portions on a surface thereof which is to face a magnetic disk, and at least one of a central recessed portion disposed between said pair of air-bearing portions and an outer recessed portion disposed on one side of said pair of air bearing portions, said pair of air bearing portions protruding a predetermined height above said central recessed portion and/or said outer recessed portion;

providing a core chip having a coil-winding aperture, an annular magnetic path defined in the presence of said aperture, and a magnetic gap which intersects said annular magnetic path;

forming a slot in said slider body such that said slot is open in an end face of the slider body, said slot being located within a width of said central recessed portion as measured in a direction perpendicular to said direction of extension of said pair of air-bearing portions, or a width of said outer recessed portion;

positioning and fixing said core chip in said slot such that an upper end portion of said core chip which has said magnetic gap protrudes a predetermined distance above a surface of said central or outer recessed portion; and subjecting said upper end portion of said core chip to an operation to form a track portion which has a leading part and a trailing part which are spaced apart by said magnetic gap in said direction of extension of said air-bearing portions.

2. A method according to claim 1, further comprising a step of effecting a grinding operation to concurrently grind surfaces of said pair of air-bearing portions and a surface of said upper end portion of the core chip which are to face said magnetic disk, so that said air-bearing portions and said upper end portion of said core chip have the same height from the surface of said central or outer recessed portion, and so that said magnetic gap has a predetermined depth dimension as measured in a direction of protrusion of said upper end portion of said core chip from the surface of said central or outer recessed portion, and wherein said step of subjecting said upper end portion of said core chip to an operation to form a track portion follows said grinding operation.

3. A method according to claim 1, wherein a top surface of said upper end portion of said core chip which is to face the magnetic disk is ground, such that said magnetic gap has a predetermined depth dimension, and wherein said step of positioning and fixing said core chip in said slot comprises fixing said core chip in said slot such that the ground top surface of said upper end portion of said core chip is flush with the surfaces of said pair of air-bearing portions.

4. A method according to claim 3, wherein said step of providing said core chip comprises:

butting and bonding together two blocks of a magnetic material to prepare a gapped bar which has an opening, an annular magnetic path in the presence of said opening, and a clearance between said two blocks;

grinding a surface of said gapped bar on which said clearance is open such that said clearance has a depth dimension equal to said predetermined depth dimension of said magnetic gap; and cutting said gapped bar into a plurality of pieces each serving as said core chip, said opening and said clearance of said gapped bar providing said coil-winding aperture and said magnetic gap of said core chip, respectively.

5. A method according to claim 1, wherein said step of positioning and fixing said core chip in said slot comprises applying a softened or molten glass to a clearance between at least one inner surface of said slider body which at least partially defines said slot and at least one outer surface of said core chip which faces said at least one inner surface of said slider body.

6. A method according to claim 5, wherein said slot is at least partially defined by a glass filler, and said step of applying a softened or molten glass to a clearance comprises heating said glass filler after said core chip is positioned in said slot.

7. A method according to claim 1, wherein said step of positioning and fixing said core chip in said slot comprises applying an adhesive to a clearance between at least one inner surface of said slider body which at least partially defines said slot and at least one outer surface of said core chip which faces said at least one inner surface of said slider body.

8. A method according to claim 7, wherein said adhesive consists of an epoxy resin in a liquid phase present in said clearance between said at least one inner surface of said slider body and said at least one outer surface of said core chip, said core chip being bonded to said slider body by thermal setting of said epoxy resin.

9. A method according to claim 7, wherein said adhesive consists of a water glass present in said clearance between said at least one inner surface of said slider body and said at least one outer surface of said core chip, said core chip being bonded to said slider body by heating and drying said water glass.

10. A method according to claim 1, further comprising a step of forming a coil-winding groove in said slider body such that said coil-winding groove intersects said slot and is open on at least said end face of said slider body in said direction of extension of said air-bearing portions.

11. A method according to claim 10, wherein a surface defining a depth of said coil-winding groove as measured in said direction of extension of said air-bearing portions is parallel to said end face of said slider body.

12. A method according to claim 11, wherein said slot is located within the width of said central recessed portion of said slider body.

13. A method according to claim 10, wherein said coil-winding groove is dimensioned such that a depth of said coil-winding groove as measured in said direction of extension of said air-bearing portions is larger than a length of said core chip as measured in said direction of extension of said air-bearing portions.

14. A method according to claim 13, wherein said slot and said coil-winding groove cooperate to provide a space around portions of said core chip positioned within said slot, which portions constitute respective parts of said annular magnetic path which define said magnetic gap therebetween, said space being ample enough to allow coils to be wound on said portions of said core chip.

15. A method according to claim 13, wherein said coil-winding groove is open on said end face of said slider body, and is also open on a side face of said slider body which is adjacent to said end face, a surface defining said depth of said coil-winding groove being inclined with respect to said end face of said slider body.

16. A method according to claim 15, wherein said slot is located within the width of said outer recessed portion of said slider body, and said side face of said slider body is adjacent to a surface of said outer recessed portion.

17. A method of manufacturing a composite type magnetic head core slider for a rigid magnetic disk drive, comprising the steps of:

providing a slider body having (a) a pair of parallel air-bearing portions formed on a surface thereof which is to face a magnetic disk, (b) a coil-winding groove which is open on one end face of opposing end faces of the slider body which are opposite to each other in a direction of extension of said air-bearing portions, said coil-winding groove extending in a direction perpendicular to said direction of extension of said air-bearing portions, and (c) and a slot which intersects said coil-winding groove and extends in said direction of extension of said air-bearing portions;

providing a core chip having a magnetic gap and being positioned and fixed in said slot;

forming said coil-winding groove so as to separate an end portion of said slider body which corresponds to said one end face of the slider body, into two opposed thickness portions which are opposed to each other in a direction perpendicular to said directions of extension of said air-bearing portions and said coil-winding groove; and removing at least a part of at least one of said two opposed thickness portions, so as to form at least one chip support arm which is adjacent to said core chip and which partially defines said slot.

18. A method according to claim 17, further comprising a step of forming said slot in said slider body such that said slot is located within a width of a central recessed portion disposed between said pair of air-bearing portions, said width being measured in the direction of extension of said coil-winding groove.

19. A method according to claim 18, wherein said step of removing at least a part of at least one of said two opposed thickness portions comprises removing parts of at least one of said two opposed thickness portions, said parts being located on both sides of said core chip as viewed in the direction of extension of said coil-winding groove, so that at least two chip support arms are formed on both sides of said core chip.

20. A method according to claim 19, wherein said step of removing parts of at least one of said two opposed thickness portions comprises removing at least parts of both of said two opposed thickness portions, said parts being located on both sides of said core chip, so that two chip support arms are formed on one side of said core chip while two other chip support arms are formed on the other side of said core chip.

21. A method according to claim 19, wherein said step of removing at least parts of at least one of said two opposed thickness portions comprises removing parts of one of said two opposed thickness portions, said parts being located on both sides of said core chip, said one of said two opposed thickness portions having portions of said air-bearing portions extending thereon, so that two chip support arms are formed on both sides of said core chip, respectively, and adjacent to said central recessed portion.

22. A method according to claim 18, wherein said step of removing at least a part of at least one of said two opposed thickness portions comprises removing a part of at least one of said two opposed thickness portions, said part being located on one of opposite sides of said core chip as viewed in the direction of extension of said coil-winding groove.

23. A method according to claim 17, further comprising a step of forming said slot in said slider body such that said slot is aligned with one of said two air bearing portions.

24. A method according to claim 23, wherein said step of removing at least a part of at least one of said two opposed thickness portions comprises removing a part of at least one of said two opposed thickness portions, said part being located on one of opposite sides of said core chip as viewed in the direction of extension of said coil-winding groove, so that at least one chip support arm is formed on said one side of said core chip.

25. A method according to claim 24, wherein said step of removing at least a part of at least one of said two opposed thickness portions comprises removing parts of both of said two opposed thickness portions, said parts are located on one of opposite sides of said core chip, so that at least two chip support arms are formed on said one side of said core chip.

26. A method according to claim 17, wherein said step of removing at least a part of at least one of said two opposed thickness portions comprises removing a part of at least one of said two opposed thickness portions, said part corresponding to a portion of a depth of said coil-winding groove as measured in the direction of extension of said air-bearing portions.

27. A method according to claim 17, wherein said step of removing at least a part of at least one of said two opposed thickness portions comprises removing a part of at least one of said two opposed thickness portions, said part corresponding to an entire depth of said coil-winding groove as measured in the direction of extension of said air-bearing portions.

28. A method according to claim 17, further comprising the steps of:

forming said slot in said slider body such that said slot is located within a width of a central recessed portion as measured in a direction perpendicular to the direction of extension of said air-bearing portions, or a width of an outer recessed portion disposed on one side of one of said air-bearing portions, said one side being remote from said central recessed portion;

positioning and fixing said core chip in said slot such that an upper end portion of said core chip which has said magnetic gap protrudes a predetermined distance above a surface of said central or outer recessed portion; and subjecting said upper end portion of said core chip to an operation to form a track portion which has a leading part and a trailing part which are spaced apart by said magnetic gap in the direction of extension of said air-bearing portions.

* * * * *